(12) United States Patent
Syu

(10) Patent No.: US 11,768,355 B2
(45) Date of Patent: Sep. 26, 2023

(54) WIDE-ANGLE LENS ASSEMBLY INCLUDING SIX LENSES OF −+−++−REFRACTIVE POWERS, OR FIVE LENSES OF −−++−REFRACTIVE POWERS

(71) Applicants: Sintai Optical (Shenzhen) Co., Ltd., ShenZhen (CN); Asia Optical Co., Inc., Taichung (TW)

(72) Inventor: Rong-Shun Syu, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 302 days.

(21) Appl. No.: 16/986,327

(22) Filed: Aug. 6, 2020

(65) Prior Publication Data

US 2021/0072512 A1  Mar. 11, 2021

(30) Foreign Application Priority Data

Sep. 11, 2019 (CN) .......................... 201910856516.9

(51) Int. Cl.
*G02B 13/00* (2006.01)
*G02B 9/62* (2006.01)
*G02B 13/06* (2006.01)

(52) U.S. Cl.
CPC ........... *G02B 13/0045* (2013.01); *G02B 9/62* (2013.01); *G02B 13/06* (2013.01)

(58) Field of Classification Search
CPC ....... G02B 13/0045; G02B 9/62; G02B 13/06
See application file for complete search history.

(56) References Cited

U.S. PATENT DOCUMENTS 9,989,736 B2  6/2018 Tang et al.
2009/0009888 A1  1/2009 Asami
(Continued)

FOREIGN PATENT DOCUMENTS

CN  201340474 Y  11/2009
CN  201765374 U  3/2011
(Continued)

OTHER PUBLICATIONS

CN-107305282-A, translation (Year: 2017).*

*Primary Examiner* — Wen Huang
(74) *Attorney, Agent, or Firm* — McClure, Qualey & Rodack, LLP

(57) ABSTRACT

A wide-angle lens assembly includes a front lens group and a rear lens group. The front lens group includes a first lens having negative refractive power and a second lens having negative refractive power, wherein the first lens is a meniscus lens and the second lens includes a concave surface facing an image side. The rear lens group includes a third lens having positive refractive power, a fourth lens having positive refractive power, and a fifth lens having negative refractive power, wherein the fifth lens includes a concave surface facing an object side. The wide-angle lens assembly satisfies: 13.6 mm≤$f_K$−$f_1$≤25.2 mm; wherein $f_K$ is an effective focal length of a lens third close to the image side and $f_1$ is an effective focal length of the first lens.

12 Claims, 20 Drawing Sheets

(56) References Cited

U.S. PATENT DOCUMENTS

| | | | | |
|---|---|---|---|---|
| 2013/0265656 A1* | 10/2013 | Asami | ................ | G02B 13/0045 |
| | | | | 359/752 |
| 2014/0160582 A1 | 6/2014 | Kubota et al. | | |
| 2018/0299647 A1* | 10/2018 | Wu | .................... | G02B 13/0045 |
| 2019/0324232 A1* | 10/2019 | Yang | ........................ | G02B 9/64 |
| 2021/0055528 A1* | 2/2021 | Wei | .................... | G02B 27/0025 |

FOREIGN PATENT DOCUMENTS

| | | | | |
|---|---|---|---|---|
| CN | 103941377 A | 7/2014 | | |
| CN | 104459946 A | 3/2015 | | |
| CN | 204302561 U | 4/2015 | | |
| CN | 105759406 A | 7/2016 | | |
| CN | 206321856 U | 7/2017 | | |
| CN | 107305282 A | * 10/2017 | ............ | G02B 13/06 |
| CN | 206930828 U | 1/2018 | | |
| CN | 108693631 A | 10/2018 | | |
| CN | 109782416 A | 5/2019 | | |
| TW | M529174 U | 9/2016 | | |
| TW | 201710732 A | 3/2017 | | |
| WO | 2018029748 A1 | 2/2018 | | |

\* cited by examiner

WIDE-ANGLE LENS ASSEMBLY INCLUDING SIX LENSES OF –+–++–REFRACTIVE POWERS, OR FIVE LENSES OF ––++–REFRACTIVE POWERS

BACKGROUND OF THE INVENTION

Field of the Invention

The invention relates to a wide-angle lens assembly.

Description of the Related Art

The current development trend of a wide-angle lens assembly is toward miniaturization and small F-number. Additionally, the wide-angle lens assembly is developed to have light weight and high resolution in accordance with different application requirements. However, the known wide-angle lens assembly can't satisfy such requirements. Therefore, the wide-angle lens assembly needs a new structure in order to meet the requirements of miniaturization, small F-number, light weight, and high resolution at the same time.

BRIEF SUMMARY OF THE INVENTION

The invention provides a wide-angle lens assembly to solve the above problems. The wide-angle lens assembly of the invention is provided with characteristics of a shortened total lens length, a reduced F-number, a reduced weight, an increased resolution, and still has a good optical performance.

The wide-angle lens assembly includes a front lens group and a rear lens group. The front lens group includes a first lens having negative refractive power and a second lens having negative refractive power, wherein the first lens is a meniscus lens and the second lens includes a concave surface facing an image side. The rear lens group includes a third lens having positive refractive power, a fourth lens having positive refractive power, and a fifth lens having negative refractive power, wherein the fifth lens includes a concave surface facing an object side. The first lens, the second lens, the third lens, the fourth lens, and the fifth lens are arranged in order from the object side to the image side along an optical axis. The wide-angle lens assembly satisfies: 13.6 mm≤$f_K$–$f_1$≤25.2 mm; wherein $f_K$ is an effective focal length of a lens third close to the image side and $f_1$ is an effective focal length of the first lens.

In yet another exemplary embodiment, the front lens group further includes a sixth lens disposed between the first lens and the second lens.

In another exemplary embodiment, the sixth lens is with positive refractive power.

In yet another exemplary embodiment, the sixth lens includes a convex surface facing the object side and a concave surface facing the image side.

In another exemplary embodiment, the sixth lens includes a concave surface facing the object side and a convex surface facing the image side.

In yet another exemplary embodiment, the sixth lens includes a convex surface facing the object side and another convex surface facing the image side.

In another exemplary embodiment, the first lens includes a convex surface facing the object side and a concave surface facing the image side, the third lens is a biconvex lens, the fourth lens is a biconvex lens, and the wide-angle lens assembly satisfies at least one of the following conditions: –11.2 mm≤$f+f_1$≤–5.3 mm; –13 mm≤$f_f$–$f$≤–8 mm; 70≤$Vd_G$+$Vd_H$≤110; 3.1≤TTL/$T_G$≤6.4; wherein f is an effective focal length of the wide-angle lens assembly, $f_1$ is an effective focal length of the first lens, $f_f$ is an effective focal length of the front lens group, $Vd_G$ is an Abbe number of a lens second close to the image side, $Vd_H$ is an Abbe number of a lens closest to the image side, TTL is an interval from an object side surface of the first lens to an image plane along the optical axis, and $T_G$ is a thickness along the optical axis of a lens second close to the image side.

In yet another exemplary embodiment, the second lens further includes a concave surface facing the object side.

In another exemplary embodiment, the fifth lens further includes a concave surface facing the image side.

In yet another exemplary embodiment, the wide-angle lens assembly satisfies: –4.2≤($f_H$+$f_1$)/f≤–3 wherein $f_1$ is an effective focal length of the first lens, $f_H$ is an effective focal length of a lens closest to the image side, and f is an effective focal length of the wide-angle lens assembly.

In another exemplary embodiment, the wide-angle lens assembly further includes an air gap disposed between the fourth lens and the fifth lens.

In yet another exemplary embodiment, the wide-angle lens assembly further includes a stop disposed between the front lens group and the rear lens group.

In another exemplary embodiment, the fifth lens further includes a convex surface facing the image side.

In yet another exemplary embodiment, the first lens includes a convex surface facing the object side and a concave surface facing the image side, the third lens is a biconvex lens, and the fourth lens is a biconvex lens.

In another exemplary embodiment, the wide-angle lens assembly satisfies: –11.2 mm≤$f+f_1$≤–5.3 mm; wherein f is an effective focal length of the wide-angle lens assembly and $f_1$ is an effective focal length of the first lens.

In yet another exemplary embodiment, the wide-angle lens assembly satisfies: –13 mm≤$f_f$–$f$≤–8 mm; wherein $f_f$ is an effective focal length of the front lens group and f is an effective focal length of the wide-angle lens assembly.

In another exemplary embodiment, the wide-angle lens assembly satisfies: 70≤$Vd_G$+$Vd_H$≤110; wherein $Vd_G$ is an Abbe number of a lens second close to the image side and $Vd_H$ is an Abbe number of a lens closest to the image side.

In yet another exemplary embodiment, the wide-angle lens assembly satisfies: –4.2≤($f_H$+$f_1$)/f≤–3; wherein $f_1$ is an effective focal length of the first lens, $f_H$ is an effective focal length of a lens closest to the image side, and f is an effective focal length of the wide-angle lens assembly.

In another exemplary embodiment, the wide-angle lens assembly satisfies: 3.1≤TTL/$T_G$≤6.4; wherein TTL is an interval from an object side surface of the first lens to an image plane along the optical axis and $T_G$ is a thickness along the optical axis of a lens second close to the image side.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
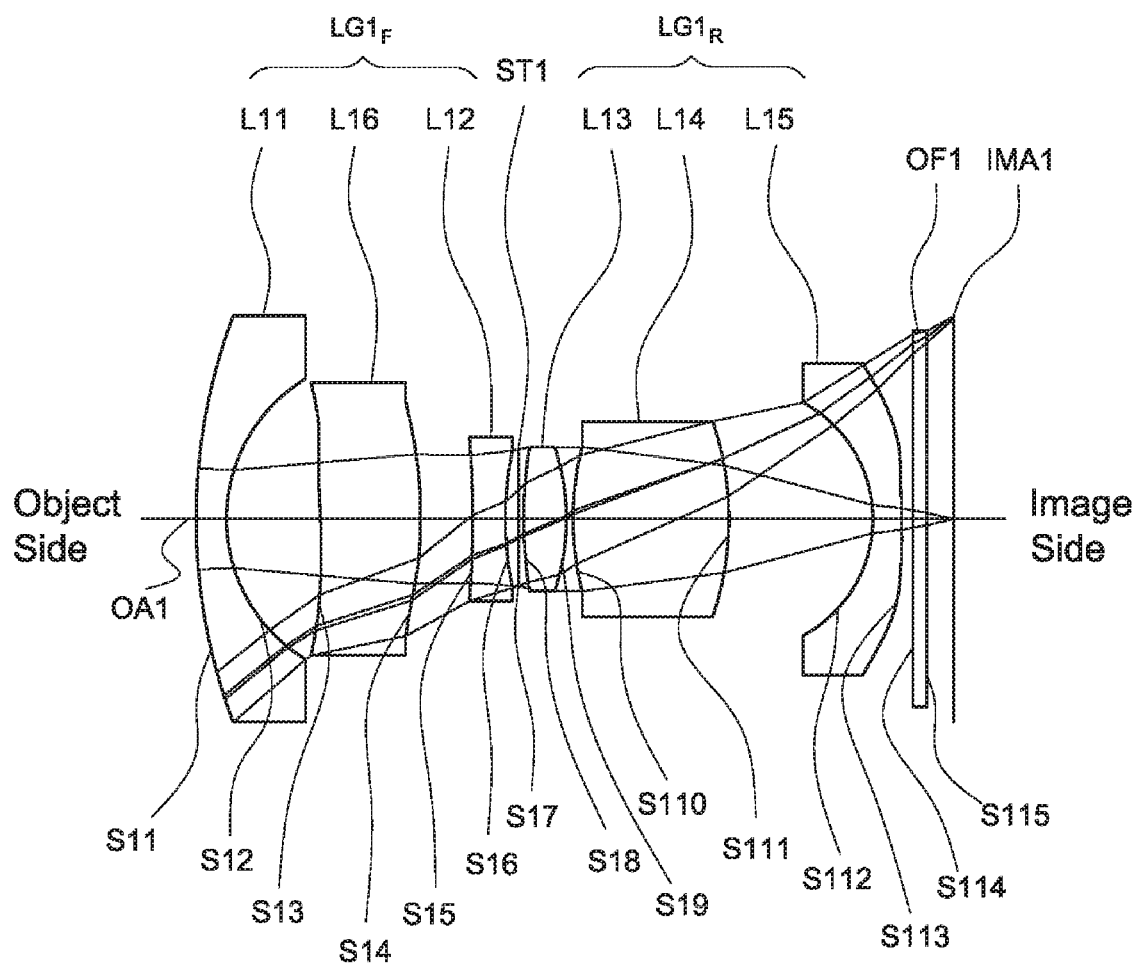
FIG. 1 is a lens layout and optical path diagram of a wide-angle lens assembly in accordance with a first embodiment of the invention.

The following description is made for the purpose of illustrating the general principles of the invention and should not be taken in a limiting sense. The scope of the invention is best determined by reference to the appended claims.

The present invention provides a wide-angle lens assembly including a front lens group and a rear lens group. The front lens group includes a first lens having negative refractive power and a second lens having negative refractive power, wherein the first lens is a meniscus lens and the second lens includes a concave surface facing an image side. The rear lens group includes a third lens having positive refractive power, a fourth lens having positive refractive power, and a fifth lens having negative refractive power, wherein the fifth lens includes a concave surface facing an object side. The first lens, the second lens, the third lens, the fourth lens, and the fifth lens are arranged in order from the object side to the image side along an optical axis. The wide-angle lens assembly satisfies: $-4.2 \le (f_H + f_1)/f \le -3$; wherein $f_H$ is an effective focal length of a lens closest to the image side, $f_1$ is an effective focal length of the first lens, and f is an effective focal length of the wide-angle lens assembly.

Referring to Table 1, Table 2, Table 4. Table 5, Table 7, Table 8, Table 10, Table 11, Table 13, and Table 4, wherein Table 1, Table 4, Table 7, Table 10, and Table 13 show optical specification in accordance with a first, second, third fourth, and fifth embodiments of the invention respectively and Table 2, Table 5, Table 8, Table 11, and Table 14 show aspheric coefficients of each aspheric lens in Table 1, Table 4, Table 7, Table 10, and Table 13 respectively.

FIG. 1, FIG. 3, FIG. 5, FIG. 7, and FIG. 9 are lens layout and optical path diagrams of the wide-angle lens assemblies in accordance with the first, second, third, fourth, and fifth embodiments of the invention respectively.

The first lenses L11, L21, L31, L41, L51 are meniscus lenses with negative refractive power and made of plastic material, wherein the object side surfaces S11, S21, S31, S41, S51 are convex surfaces, the image side surfaces S12, S22, S32, S42, S52 are concave surfaces, the object side surfaces S11, S21, S31, S41, S51 and the image side surfaces S12, S22, S32, S42, S52 are aspheric surfaces.

The second lenses L12, L22, L32, L42, L52 are with negative refractive power and made of plastic material, wherein the image side surfaces S16, S26, S36, S46, S54 are concave surfaces and the image side surfaces S16, S26, S36, S46, S54 are aspheric surfaces.

The third lenses L13, L23, L33, L43, L53 are biconvex lenses with positive refractive power and made of plastic material, wherein the object side surfaces S18, S28, S38, S48, S56 are convex surfaces, the image side surfaces S19, S29, S39, S49, S57 are convex surfaces, and the object side surfaces S18, S28, S38, S48, S56 and the image side surfaces S19, S29, S39, S49, S57 are aspheric surfaces.

The fourth lenses L14, L24, L34, L44, L54 are biconvex lenses with positive refractive power and made of plastic material, wherein the object side surfaces S110, S210, S310, S410, S58 are convex surfaces and the image side surfaces S11, S211, S311, S411, S59 are convex surfaces.

The fifth lenses L15, L25, L35, L45, L55 are with negative refractive power and made of plastic material, wherein the object side surfaces S112, S212, S312, S412, S510 are concave surfaces and the object side surfaces S112, S212, S312, S412, S510 and the image side surfaces S113, S213, S313, S413, S511 are aspheric surfaces.

The sixth lenses L16, L26, L36, L46 are with positive refractive power and made of plastic material, wherein the object side surfaces S13, S23, S33, S43 are aspheric surfaces.

In addition, the wide-angle lens assemblies 1, 2, 3, 4, 5 satisfy at least one of the following conditions:

$$-4.2 \le (f_H + f_1)/f \le -3; \tag{1}$$

$$-11.2 \text{ mm} \le f + f_1 \le -5.3 \text{ mm}; \tag{2}$$

$-13 \text{ mm} \leq f_f - f \leq -8 \text{ mm};$ (3)

$70 \leq Vd_G + Vd_H \leq 110;$ (4)

$13.6 \text{ mm} \leq f_K - f_1 \leq 25.2 \text{ mm};$ (5)

$3.1 \leq TTL/T_G \leq 6.4;$ (6)

wherein $f_1$ is an effective focal length of the first lenses L11, L21, L31, L41, L51 for the first to fifth embodiments, $f_H$ is an effective focal length of the lenses L15, L25, L35, L45, L55 which are closest to the image side for the first to fifth embodiments, $f_f$ is an effective focal length of the front lens groups $LG1_F$, $LG2_F$, $LG3_F$, $LG4_F$, $LG5_F$ for the first to fifth embodiments, f is an effective focal length of the lenses L13, L23, L33, L43, L53 which are third close to the image side for the first to fifth embodiments, f is an effective focal length of the wide-angle lens assemblies 1, 2, 3, 4, 5 for the first to fifth embodiments, $Vd_H$ is an Abbe number of the lenses L15, L25, L35, L45, L55 which are closest to the image side for the first to fifth embodiments, $Vd_G$ is an Abbe number of the lenses L14, L24. L34, L44, L54 which are second close to the image side for the first to fifth embodiments, TTL is an interval from the object side surfaces S1, S21, S31, S41. S51 of the first lenses L11, L21, L31, L41, L51 to the image planes IMA1, IMA2, IMA3, IMA4, IMA5 along the optical axes OA1, OA2, OA3, OA4, OA5 respectively for the first to fifth embodiments, and $T_G$ is a thickness of the lenses L14, L24, L34, L44, L54 which are second close to the image side along the optical axes OA1, OA2, OA3, OA4, OA5 for the first to fifth embodiments. With the wide-angle lens assemblies 1, 2, 3, 4, 5 satisfying at least one of the above conditions (1)-(6), the total lens length can be effectively shortened, the F-number can be effectively reduced, the weight can be effectively reduced, the resolution can be effectively increased, the aberration can be effectively corrected, and the chromatic aberration can be effectively corrected.

A detailed description of a wide-angle lens assembly in accordance with a first embodiment of the invention is as follows. Referring to FIG. 1, the wide-angle lens assembly 1 includes a front lens group $LG1_F$, a stop ST1, a rear lens group $LG1_R$, and an optical filter OF1, all of which are arranged in order from an object side to an image side along an optical axis OA1. The front lens group $LG1_F$ includes a first lens L11, a sixth lens L16, and a second lens L12. The rear lens group $LG1_R$ includes a third lens L13, a fourth lens L14, and a fifth lens L15. In operation, an image of light rays from the object side is formed at an image plane IMA1.

According to the foregoing, wherein: the second lens L12 is a biconcave lens, wherein the object side surface S15 is a concave surface and the object side surface S15 is an aspheric surface; the object side surface S110 and image side surface S111 of the fourth lens L14 are spherical surfaces; the fifth lens L15 is a meniscus lens, wherein the image side surface S113 is a convex surface; the sixth lens L16 is a meniscus lens, wherein the object side surface S13 is a concave surface, the image side surface S14 is a convex surface, and the image side surface S14 is an aspheric surface; and both of the object side surface S114 and image side surface S115 of the optical filter OF1 are plane surfaces.

With the above design of the lenses, stop ST1, and at least any one of the conditions (1)-(6) satisfied, the wide-angle lens assembly 1 can have an effective shortened total lens length, an effective reduced F-number, an effective reduced weight, an effective increased resolution, an effective corrected aberration, and is capable of an effective corrected chromatic aberration.

Table 1 shows the optical specification of the wide-angle lens assembly 1 in FIG. 1.

TABLE 1

Effective Focal Length = 3.765 mm F-number = 2.4
Total Lens Length = 12.0565 mm Field of View = 106 Degrees

| Surface Number | Radius of Curvature (mm) | Thickness (mm) | Nd | Vd | Effective Focal Length (mm) | Remark |
|---|---|---|---|---|---|---|
| S11 | 5.51 | 0.50 | 1.5 | 55 | −9.34 | Front Lens Group $LG1_F$ The First Lens L11 |
| S12 | 2.46 | 1.49 | | | | |
| S13 | −16.75 | 1.58 | 1.6 | 20 | 14.01 | Front Lens Group $LG1_F$ The Sixth Lens L16 |
| S14 | −5.85 | 0.84 | | | | |
| S15 | −37.91 | 0.52 | 1.6 | 20 | −6.02 | Front Lens Group $LG1_F$ The Second Lens L12 |
| S16 | 4.08 | 0.21 | | | | |
| S17 | ∞ | 0.09 | | | | Stop ST1 |
| S18 | 6.32 | 0.67 | 1.5 | 55 | 4.86 | Rear Lens Group $LG1_R$ The Third Lens L13 |
| S19 | −3.84 | 0.10 | | | | |
| S110 | 4.22 | 2.48 | 1.5 | 80 | 5.13 | Rear Lens Group $LG1_R$ The Fourth Lens L14 |
| S111 | −5.30 | 2.28 | | | | |
| S112 | −2.32 | 0.47 | 1.6 | 24 | −4.45 | Rear Lens Group $LG1_R$ The Fifth Lens L15 |
| S113 | −17.68 | 0.22 | | | | |
| S114 | ∞ | 0.21 | 1.5 | 64 | | Optical Filter OF1 |
| S115 | ∞ | 0.43 | | | | |

The aspheric surface sag z of each aspheric lens in table 1 can be calculated by the following formula:

$$z = ch^2 / \{1 + [1 - (k+1)c^2h^2]_{1/2}\} + Ah^4 + Bh^6 + Ch^8$$

where c is curvature, h is the vertical distance from the lens surface to the optical axis k is conic constant and A, B, and C are aspheric coefficients.

In the first embodiment, the conic constant k and the aspheric coefficients A, B, C of each aspheric lens are shown in Table 2.

TABLE 2

| Surface Number | k | A | B | C |
|---|---|---|---|---|
| S11 | 0 | −8.10E−03 | 4.60E−04 | −8.92E−06 |
| S12 | 0 | −7.48E−03 | 3.52E−04 | −5.01E−05 |
| S13 | 0 | 3.87E−03 | −6.56E−04 | −5.00E−05 |
| S14 | 0 | 1.08E−02 | −2.21E−03 | 2.01E−04 |
| S15 | 0 | −1.14E−02 | 2.14E−03 | 0.00E+00 |
| S16 | 0 | −2.85E−02 | 5.97E−03 | 0.00E+00 |
| S18 | 0 | −1.22E−02 | 1.15E−03 | 0.00E+00 |
| S19 | 0 | −6.16E−04 | −7.03E−04 | 0.00E+00 |
| S112 | 0 | −1.94E−02 | 2.95E−03 | −2.70E−04 |
| S113 | 0 | −2.03E−02 | 1.83E−03 | −7.28E−05 |

Table 3 shows the parameters and condition values for conditions (1)-(6) in accordance with the first embodiment of the invention. It can be seen from Table 3 that the wide-angle lens assembly 1 of the first embodiment satisfies the conditions (1)-(6).

TABLE 3

| $f_f$ | −4.346 mm | | | | |
|---|---|---|---|---|---|
| $(f_H + f_I)/f$ | −3.663 | $f + f_I$ | −5.58 mm | $f_f - f$ | −8.111 mm |
| $Vd_G + Vd_H$ | 104 | $f_K - f_I$ | 14.20 mm | $TTL/T_G$ | 4.88 |

Figure 2A:
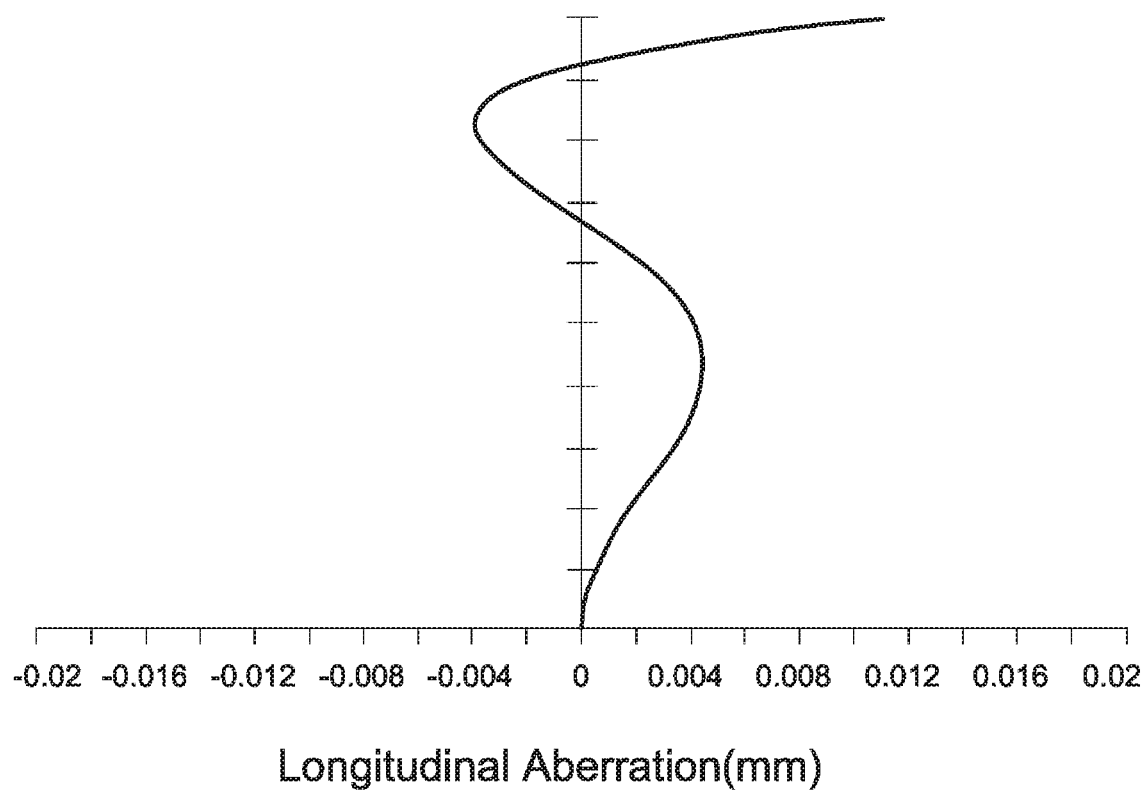
FIG. 2A depicts a longitudinal aberration diagram of the wide-angle lens assembly in accordance with the first embodiment of the invention.
Figure 2B:
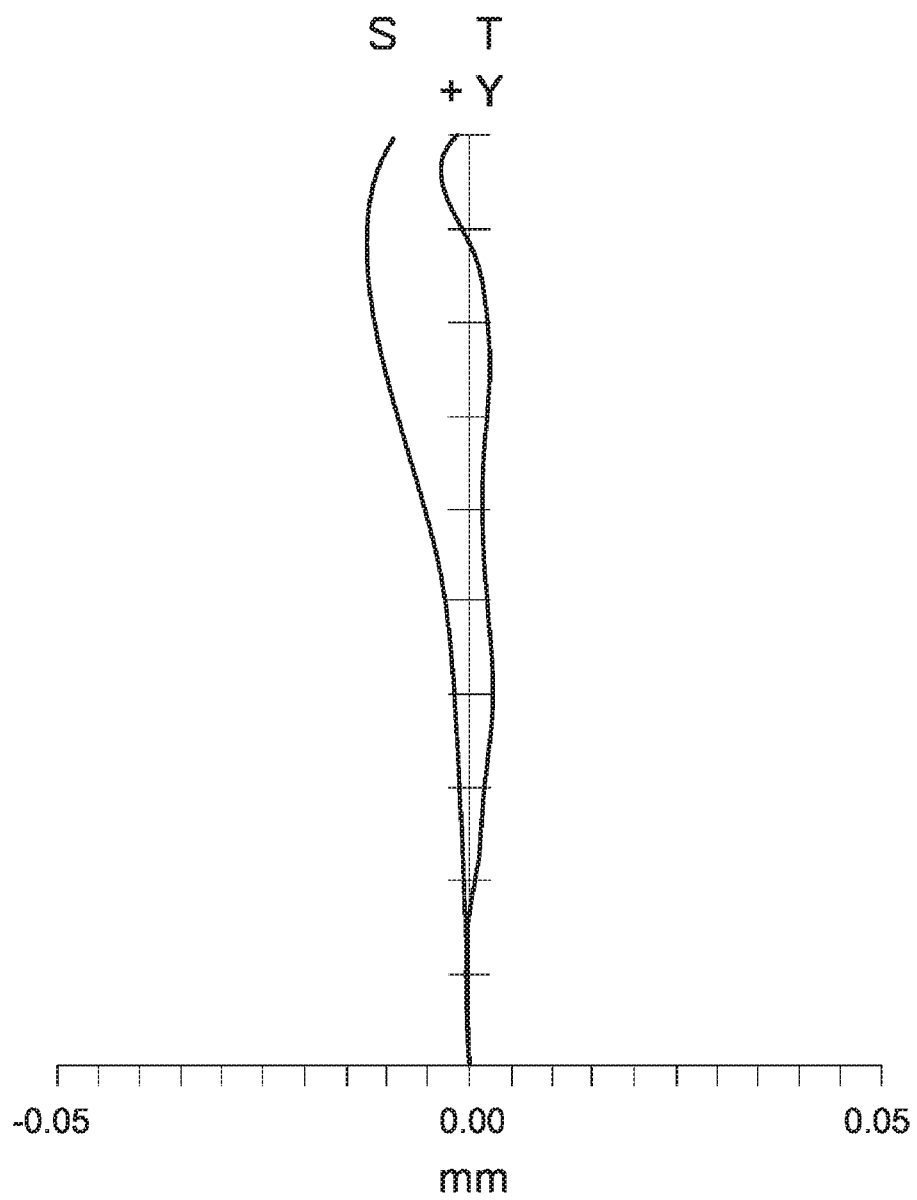
FIG. 2B is a field curvature diagram of the wide-angle lens assembly in accordance with the first embodiment of the invention.
Figure 2C:
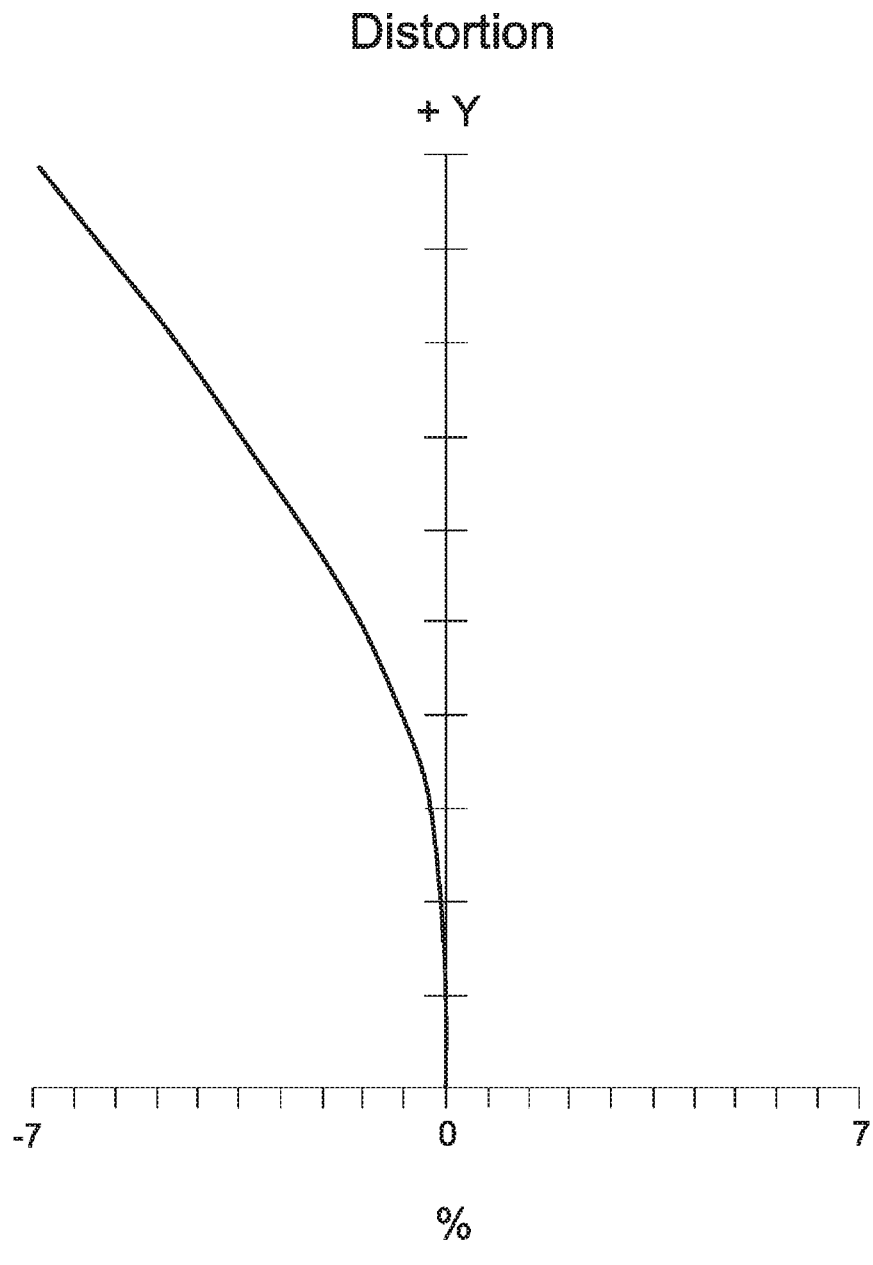
FIG. 2C is a distortion diagram of the wide-angle lens assembly in accordance with the first embodiment of the invention.

By the above arrangements of the lenses and stop ST1, the wide-angle lens assembly 1 of the first embodiment can meet the requirements of optical performance as seen in FIGS. 2A-2C.

It can be seen from FIG. 2A that the longitudinal aberration in the wide-angle lens assembly 1 of the first embodiment ranges from −0.004 mm to 0.011 mm.

It can be seen from FIG. 2B that the field curvature of tangential direction and sagittal direction in the wide-angle lens assembly 1 of the first embodiment ranges from −0.015 mm to 0.005 mm.

It can be seen from FIG. 2C that the distortion in the wide-angle lens assembly 1 of the first embodiment ranges from −7% to (o.

It is obvious that the longitudinal aberration, the field curvature, and the distortion of the wide-angle lens assembly 1 of the first embodiment can be corrected effectively. Therefore, the wide-angle lens assembly 1 of the first embodiment is capable of good optical performance.

Figure 3:
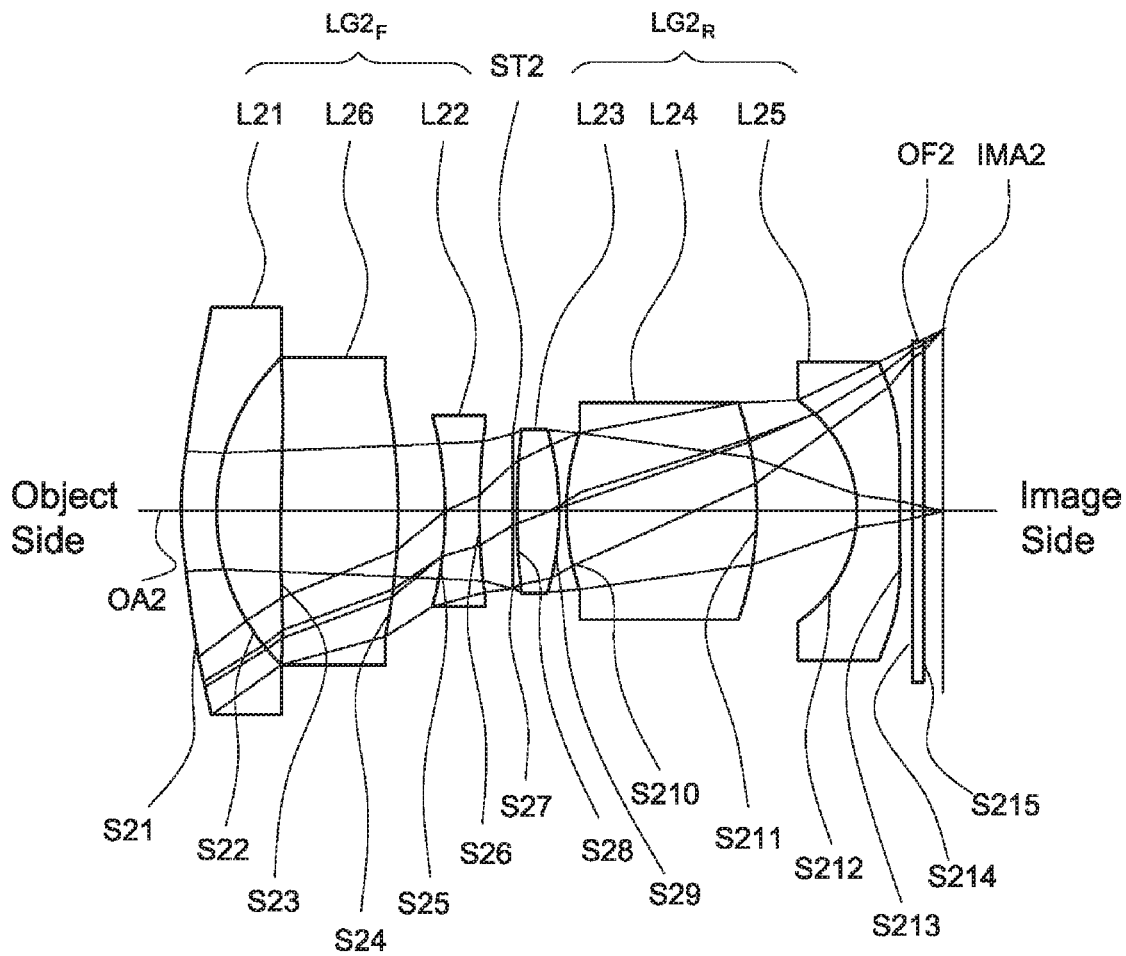
FIG. 3 is a lens layout and optical path diagram of a wide-angle lens assembly in accordance with a second embodiment of the invention.

Referring to FIG. 3, FIG. 3 is a lens layout and optical path diagram of a wide-angle lens assembly in accordance with a second embodiment of the invention. The wide-angle lens assembly 2 includes a front lens group $LG2_F$, a stop ST2, a rear lens group $LG2_R$, and an optical filter OF2, all of which are arranged in order from an object side to an image side along an optical axis OA2. The front lens group $LG2_F$ includes a first lens L21, a sixth lens L26, and a second lens L22. The rear lens group $LG2_R$ includes a third lens L23, a fourth lens L24, and a fifth lens L25. In operation, an image of light rays from the object side is formed at an image plane IMA2.

According to the foregoing, wherein: the second lens L22 is a biconcave lens, wherein the object side surface S25 is a concave surface and the object side surface S25 is an aspheric surface; the object side surface S210 and image side surface S211 of the fourth lens L24 are spherical surfaces; the fifth lens L25 is a biconcave lens, wherein the image side surface S213 is a concave surface; the sixth lens L26 is a biconvex lens, wherein the object side surface S23 is a convex surface, the image side surface S24 is a convex surface, and the image side surface S24 is an aspheric surface; and both of the object side surface S214 and image side surface S215 of the optical filter OF2 are plane surfaces.

With the above design of the lenses, stop ST2, and at least any one of the conditions (1)-(6) satisfied, the wide-angle lens assembly 2 can have an effective shortened total lens length, an effective reduced F-number, an effective reduced weight, an effective increased resolution, an effective corrected aberration, and is capable of an effective corrected chromatic aberration.

Table 4 shows the optical specification of the wide-angle lens assembly 2 in FIG. 3.

TABLE 4

Effective Focal Length = 5.1885 mm F-number = 2.0
Total Lens Length = 16.783 mm Field of View = 96.8 Degrees

| Surface Number | Radius of Curvature (mm) | Thickness (mm) | Nd | Vd | Effective Focal Length (mm) | Remark |
|---|---|---|---|---|---|---|
| S21 | 8.76 | 0.75 | 1.5 | 55 | −16.1074 | Front Lens Group $LG2_F$ The First Lens L21 |
| S22 | 4.09 | 1.44 | | | | |
| S23 | 48.02 | 2.59 | 1.6 | 20 | 20.2562 | Front Lens Group $LG2_F$ The Sixth Lens L26 |
| S24 | −16.24 | 1.04 | | | | |
| S25 | −10.04 | 0.76 | 1.6 | 20 | −8.5456 | Front Lens Group $LG2_F$ The Second Lens L22 |
| S26 | 11.08 | 0.70 | | | | |
| S27 | ∞ | 0.09 | | | | Stop ST2 |
| S28 | 10.56 | 1.00 | 1.5 | 55 | 6.94203 | Rear Lens Group $LG2_R$ The Third Lens L23 |
| S29 | −5.05 | 0.09 | | | | |
| S210 | 5.21 | 4.23 | 1.5 | 70 | 6.681197 | Rear Lens Group $LG2_R$ The Fourth Lens L24 |
| S211 | −6.87 | 2.22 | | | | |
| S212 | −3.35 | 0.94 | 1.6 | 24 | −5.37285 | Rear Lens Group $LG2_R$ The Fifth Lens L25 |
| S213 | 146.42 | 0.29 | | | | |
| S214 | ∞ | 0.21 | 1.5 | 64 | | Optical Filter OF2 |
| S215 | ∞ | 0.43 | | | | |

The definition of aspheric surface sag z of each aspheric lens in table 4 is the same as that of in Table 1, and is not described here again.

In the second embodiment, the conic constant k and the aspheric coefficients A, B, C of each aspheric lens are shown in Table 5.

TABLE 5

| Surface Number | k | A | B | C |
|---|---|---|---|---|
| S21 | 0 | −2.41E−03 | 5.34E−05 | −2.97E−07 |
| S22 | 0 | −2.63E−03 | 2.60E−05 | −2.97E−06 |
| S23 | 0 | 5.58E−05 | −5.21E−05 | −2.72E−06 |
| S24 | 0 | 7.17E−04 | −1.72E−04 | 3.96E−06 |
| S25 | 0 | −2.85E−03 | 1.42E−05 | 0.00E+00 |
| S26 | 0 | −2.92E−03 | 2.67E−04 | 0.00E+00 |
| S28 | 0 | −1.75E−03 | −5.57E−05 | 0.00E+00 |
| S29 | 0 | −5.51E−05 | −7.57E−05 | 0.00E+00 |
| S212 | 0 | −9.93E−03 | 6.04E−04 | −4.62E−06 |
| S213 | 0 | −6.44E−03 | 1.06E−04 | 7.44E−06 |

Table 6 shows the parameters and condition values for conditions (1)-(6) in accordance with the second embodiment of the invention. It can be seen from Table 6 that the wide-angle lens assembly 2 of the second embodiment satisfies the conditions (1)-(6).

TABLE 6

| $f_f$ | −7.14 mm | | | | |
|---|---|---|---|---|---|
| $(f_H + f_1)/f$ | −4.14 | $f + f_1$ | −10.92 mm | $f_f - f$ | −12.3285 mm |
| $Vd_G + Vd_H$ | 94 | $f_K - f_1$ | 23.05 mm | $TTL/T_G$ | 3.967 |

Figure 4A:
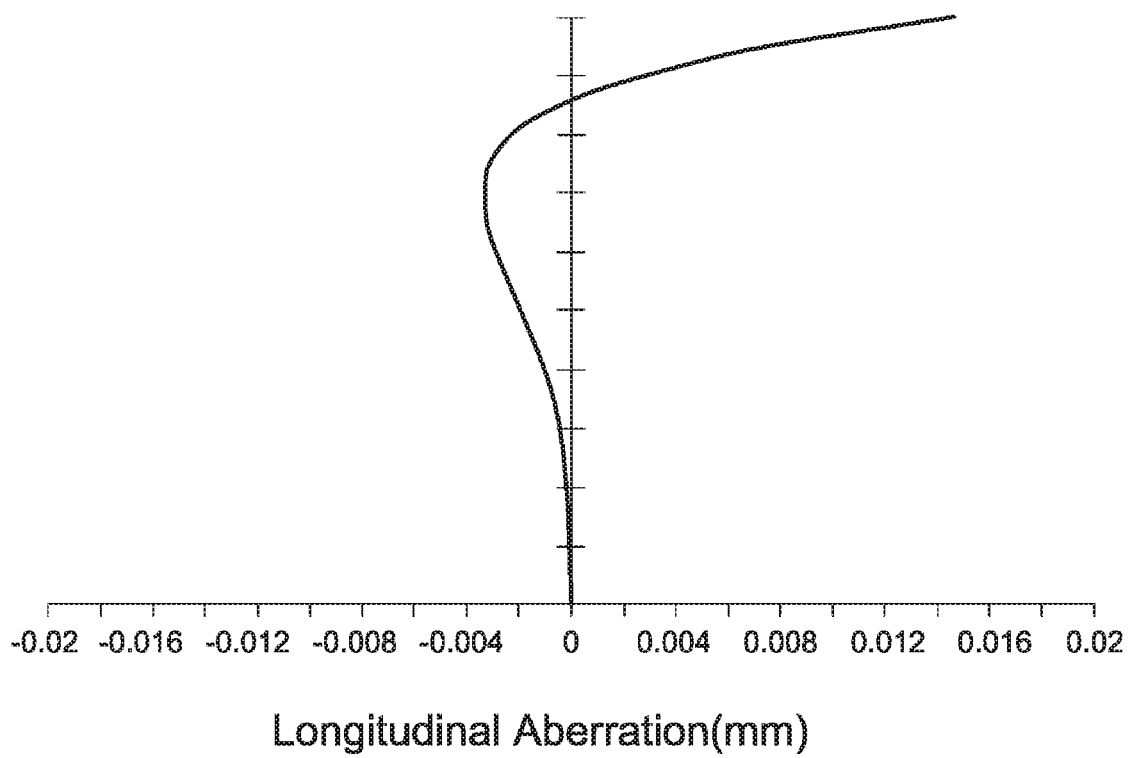
FIG. 4A depicts a longitudinal aberration diagram of the wide-angle lens assembly in accordance with the second embodiment of the invention.
Figure 4B:
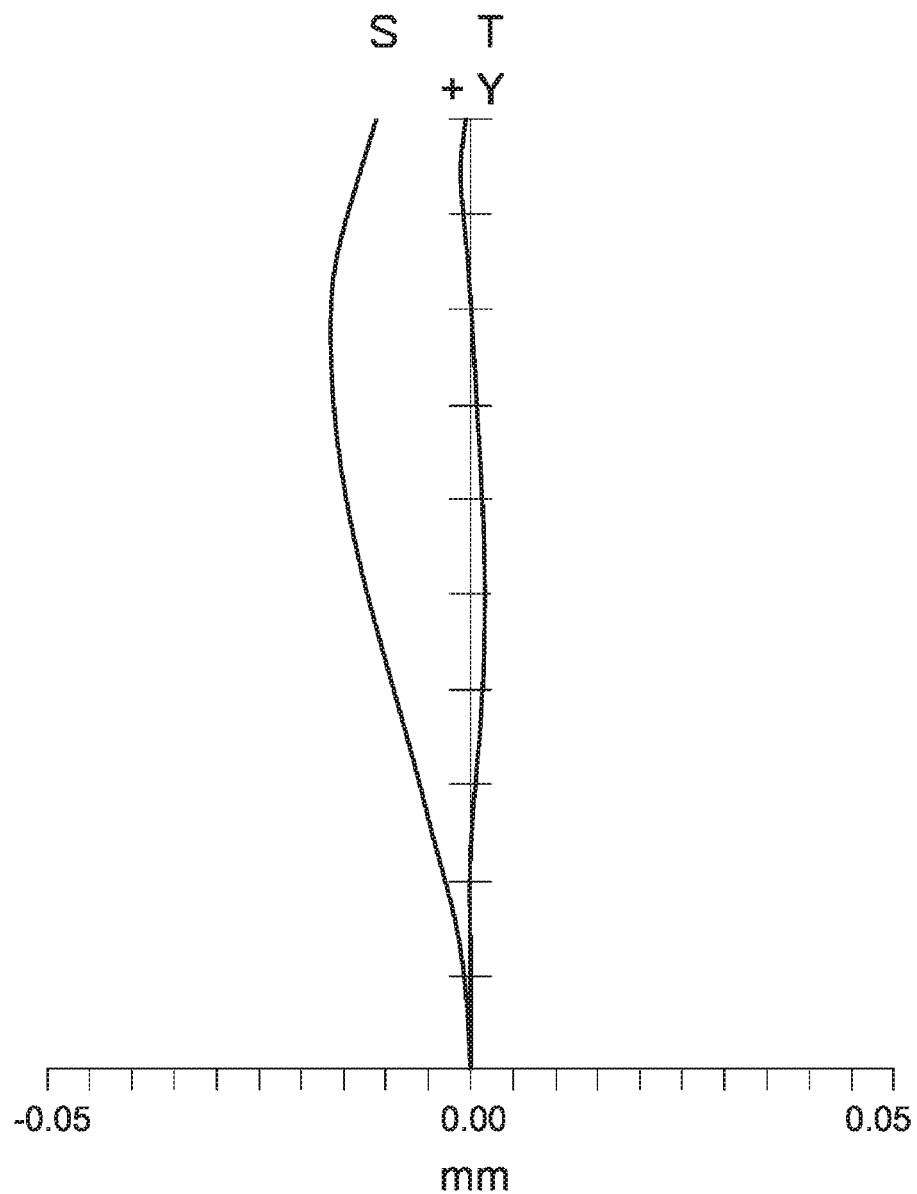
FIG. 4B is a field curvature diagram of the wide-angle lens assembly in accordance with the second embodiment of the invention.
Figure 4C:
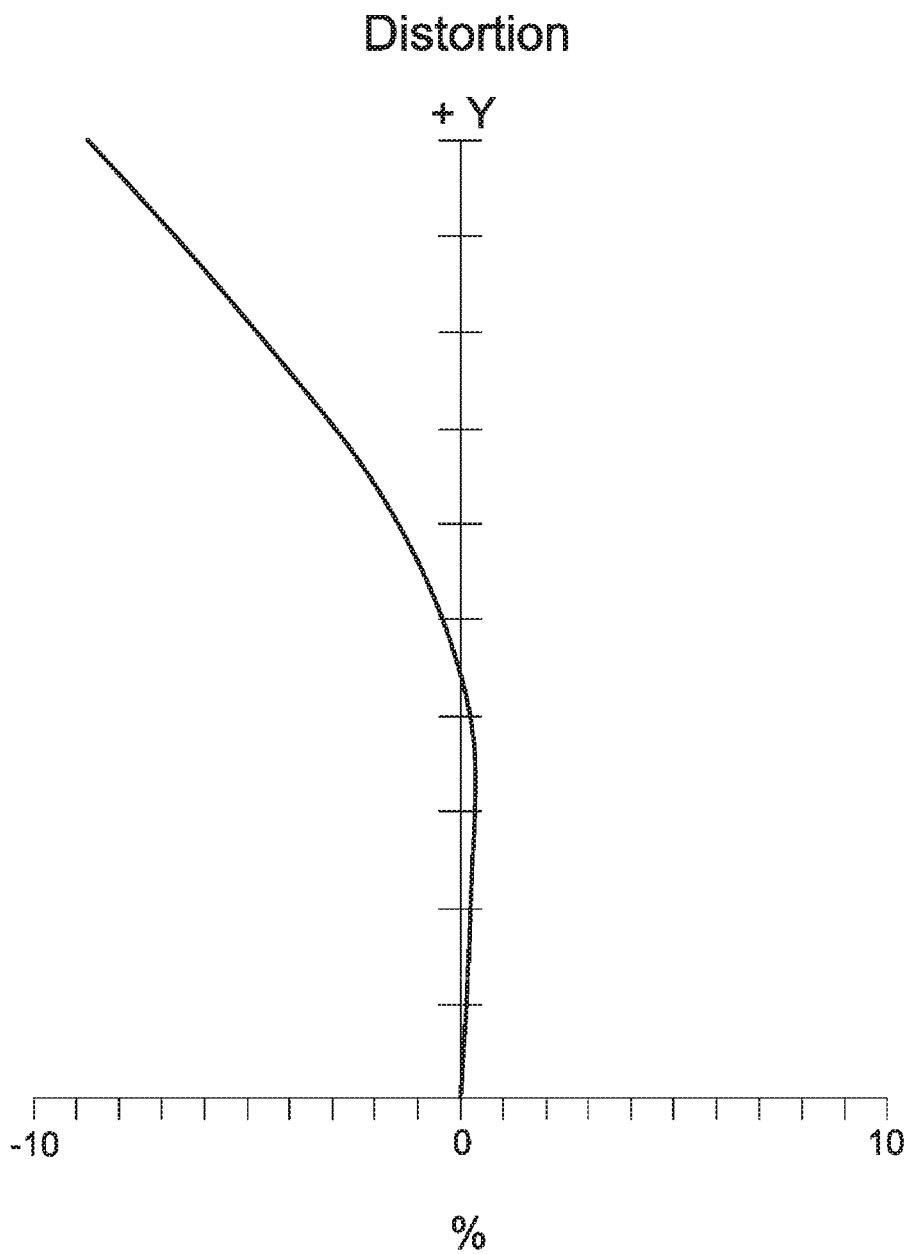
FIG. 4C is a distortion diagram of the wide-angle lens assembly in accordance with the second embodiment of the invention.

By the above arrangements of the lenses and stop ST2, the wide-angle lens assembly 2 of the second embodiment can meet the requirements of optical performance as seen in FIGS. 4A-4C.

It can be seen from FIG. 4A that the longitudinal aberration in the wide-angle lens assembly 2 of the second embodiment ranges from −0.004 mm to 0.015 mm.

It can be seen from FIG. 4B that the field curvature of tangential direction and sagittal direction in the wide-angle lens assembly 2 of the second embodiment ranges from −0.02 mm to 0.005 mm.

It can be seen from FIG. 4C that the distortion in the wide-angle lens assembly 2 of the second embodiment ranges from −9% to 1%.

It is obvious that the longitudinal aberration, the field curvature, and the distortion of the wide-angle lens assembly 2 of the second embodiment can be corrected effectively. Therefore, the wide-angle lens assembly 2 of the second embodiment is capable of good optical performance.

Figure 5:
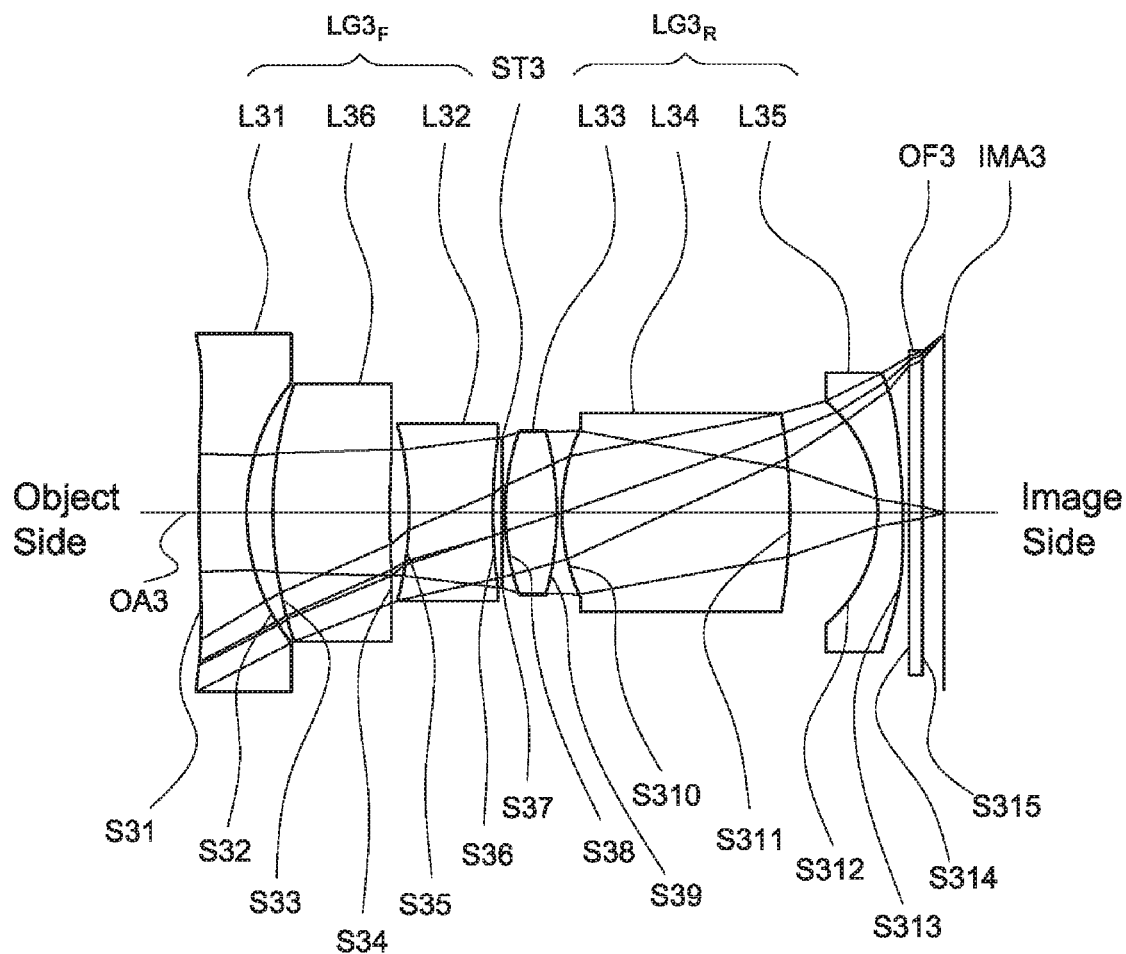
FIG. 5 is a lens layout and optical path diagram of a wide-angle lens assembly in accordance with a third embodiment of the invention.

Referring to FIG. 5, FIG. 5 is a lens layout and optical path diagram of a wide-angle lens assembly in accordance with a third embodiment of the invention. The wide-angle lens assembly 3 includes a front lens group $LG3_F$, a stop ST3, a rear lens group $LG3_R$, and an optical filter OF3, all of which are arranged in order from an object side to an image side along an optical axis OA3. The front lens group $LG3_F$ includes a first lens L31, a sixth lens L36, and a second lens L32. The rear lens group $LG3_R$ includes a third lens L33, a fourth lens L34, and a fifth lens L35. In operation, an image of light rays from the object side is formed at an image plane IMA3.

According to the foregoing, wherein: the second lens L32 is a biconcave lens, wherein the object side surface S35 is a concave surface and the object side surface S35 is an aspheric surface; the object side surface S310 and image side surface S311 of the fourth lens L34 are spherical surfaces; the fifth lens L35 is a meniscus lens, wherein the image side surface S313 is a convex surface; the sixth lens L36 is a meniscus lens, wherein the object side surface S33 is a convex surface, the image side surface S34 is a concave surface, and the image side surface S34 is an aspheric surface; and both of the object side surface S314 and image side surface S315 of the optical filter OF3 are plane surfaces.

With the above design of the lenses, stop ST3, and at least any one of the conditions (1)-(6) satisfied, the wide-angle lens assembly 3 can have an effective shortened total lens length, an effective reduced F-number, an effective reduced weight, an effective increased resolution, an effective corrected aberration, and is capable of an effective corrected chromatic aberration.

Table 7 shows the optical specification of the wide-angle lens assembly 3 in FIG. 5.

TABLE 7

Effective Focal Length = 5.284 mm F-number = 2.0
Total Lens Length = 16.856 mm Field of View = 100 Degrees

| Surface Number | Radius of Curvature (mm) | Thickness (mm) | Nd | Vd | Effective Focal Length (mm) | Remark |
|---|---|---|---|---|---|---|
| S31 | 20.03 | 1.11 | 1.5 | 55 | −10.9374 | Front Lens Group $LG3_F$ The First Lens L31 |
| S32 | 4.23 | 0.55 | | | | |
| S33 | 8.95 | 2.66 | 1.6 | 20 | 18.7322 | Front Lens Group $LG3_F$ The Sixth Lens L36 |
| S34 | 36.97 | 0.44 | | | | |
| S35 | −7.02 | 1.89 | 1.6 | 20 | −7.2486 | Front Lens Group $LG3_F$ The Second Lens L32 |
| S36 | 13.05 | 0.21 | | | | |
| S37 | ∞ | 0.06 | | | | Stop ST3 |
| S38 | 5.55 | 1.19 | 1.5 | 55 | 5.90902 | Rear Lens Group $LG3_R$ The Third Lens L33 |
| S39 | −5.93 | 0.09 | | | | |
| S310 | 4.46 | 5.18 | 1.5 | 55 | 6.776642 | Rear Lens Group $LG3_R$ The Fourth Lens L34 |
| S311 | −8.80 | 1.96 | | | | |
| S312 | −3.14 | 0.54 | 1.6 | 20 | −5.45901 | Rear Lens Group $LG3_R$ The Fifth Lens L35 |
| S313 | −60.37 | 0.17 | | | | |
| S314 | ∞ | 0.26 | 1.5 | 64 | | Optical Filter OF3 |
| S315 | ∞ | 0.53 | | | | |

The definition of aspheric surface sag z of each aspheric lens in table 7 is the same as that of in Table 1, and is not described here again.

In the third embodiment, the conic constant k and the aspheric coefficients A, B, C of each aspheric lens are shown in Table 8.

TABLE 8

| Surface Number | k | A | B | C |
|---|---|---|---|---|
| S31 | 0 | −3.19E−03 | 1.19E−04 | −1.74E−06 |
| S32 | 0 | −3.79E−03 | 1.05E−04 | 2.08E−06 |
| S33 | 0 | −2.01E−04 | 4.54E−05 | −3.37E−06 |
| S34 | 0 | −4.97E−04 | 2.43E−05 | −7.34E−06 |
| S35 | 0 | −6.25E−05 | −8.35E−05 | 0.00E+00 |
| S36 | 0 | 1.02E−03 | −3.65E−04 | 0.00E+00 |
| S38 | 0 | 1.37E−03 | −2.04E−04 | 0.00E+00 |
| S39 | 0 | 1.71E−03 | 1.40E−04 | 0.00E+00 |
| S310 | 0 | −1.23E−03 | −1.25E−04 | 0.00E+00 |
| S311 | 0 | 1.19E−03 | 2.22E−04 | 0.00E+00 |
| S312 | 0 | −5.06E−03 | 1.49E−03 | −5.66E−05 |
| S313 | 0 | −8.89E−03 | 7.18E−04 | −1.69E−05 |

Table 9 shows the parameters and condition values for conditions (1)-(6) in accordance with the third embodiment of the invention. It can be seen from Table 9 that the wide-angle lens assembly 3 of the third embodiment satisfies the conditions (1)-(6).

TABLE 9

| $f_f$ | −5.248 mm | | | | |
|---|---|---|---|---|---|
| $(f_H + f_1)/f$ | −3.103 | $f + f_1$ | −5.65 mm | $f_f - f$ | −10.532 mm |
| $Vd_G + Vd_H$ | 75 | $f_K - f_1$ | 16.85 mm | $TTL/T_G$ | 3.251 |

Figure 6A:
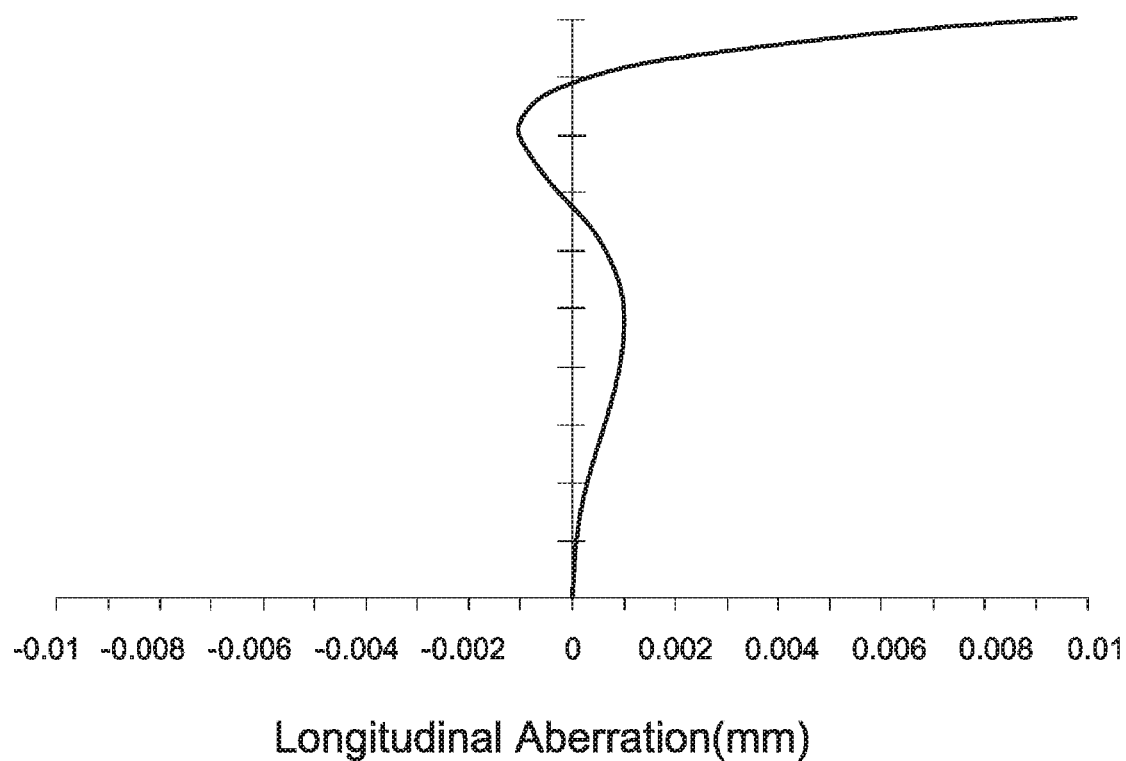
FIG. 6A depicts a longitudinal aberration diagram of the wide-angle lens assembly in accordance with the third embodiment of the invention.
Figure 6B:
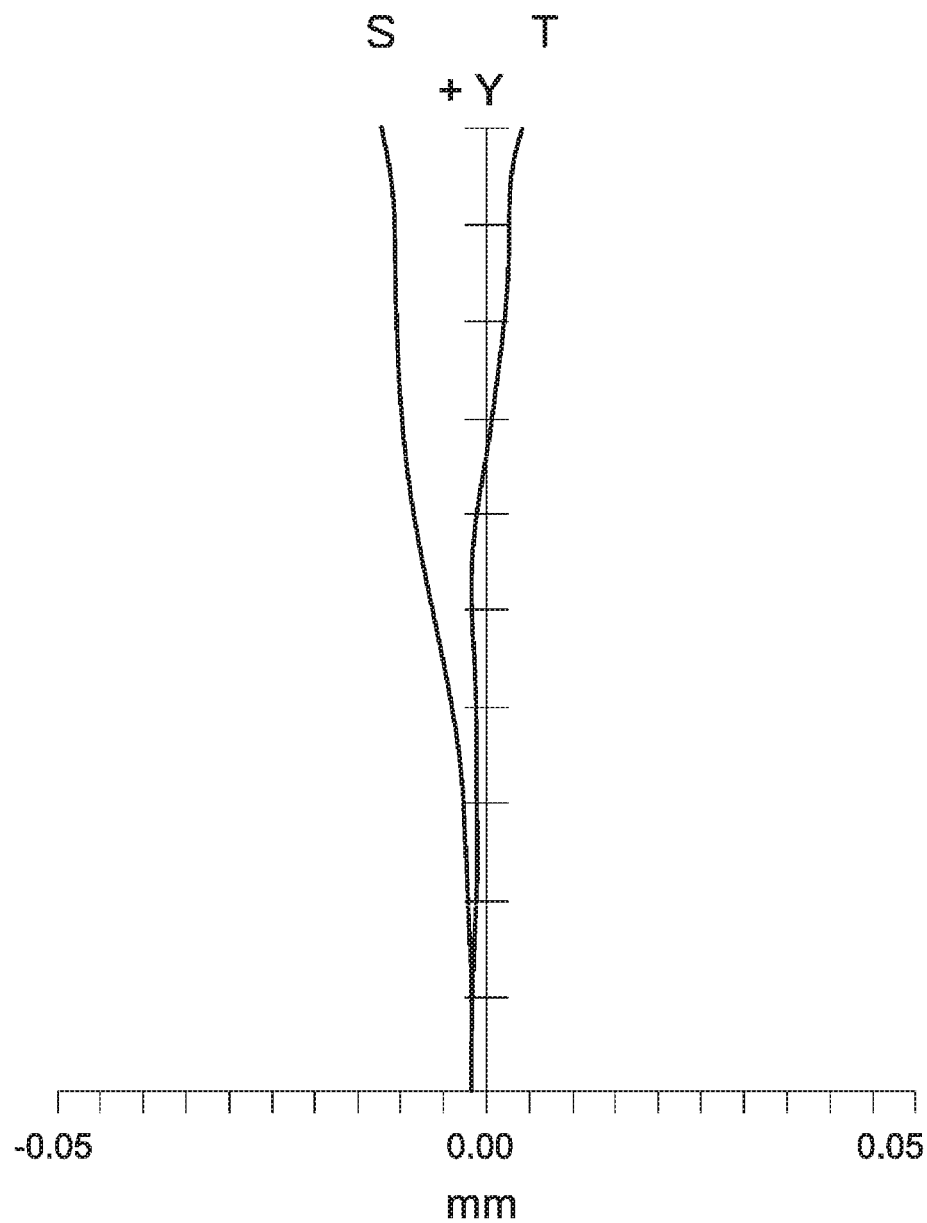
FIG. 6B is a field curvature diagram of the wide-angle lens assembly in accordance with the third embodiment of the invention.
Figure 6C:
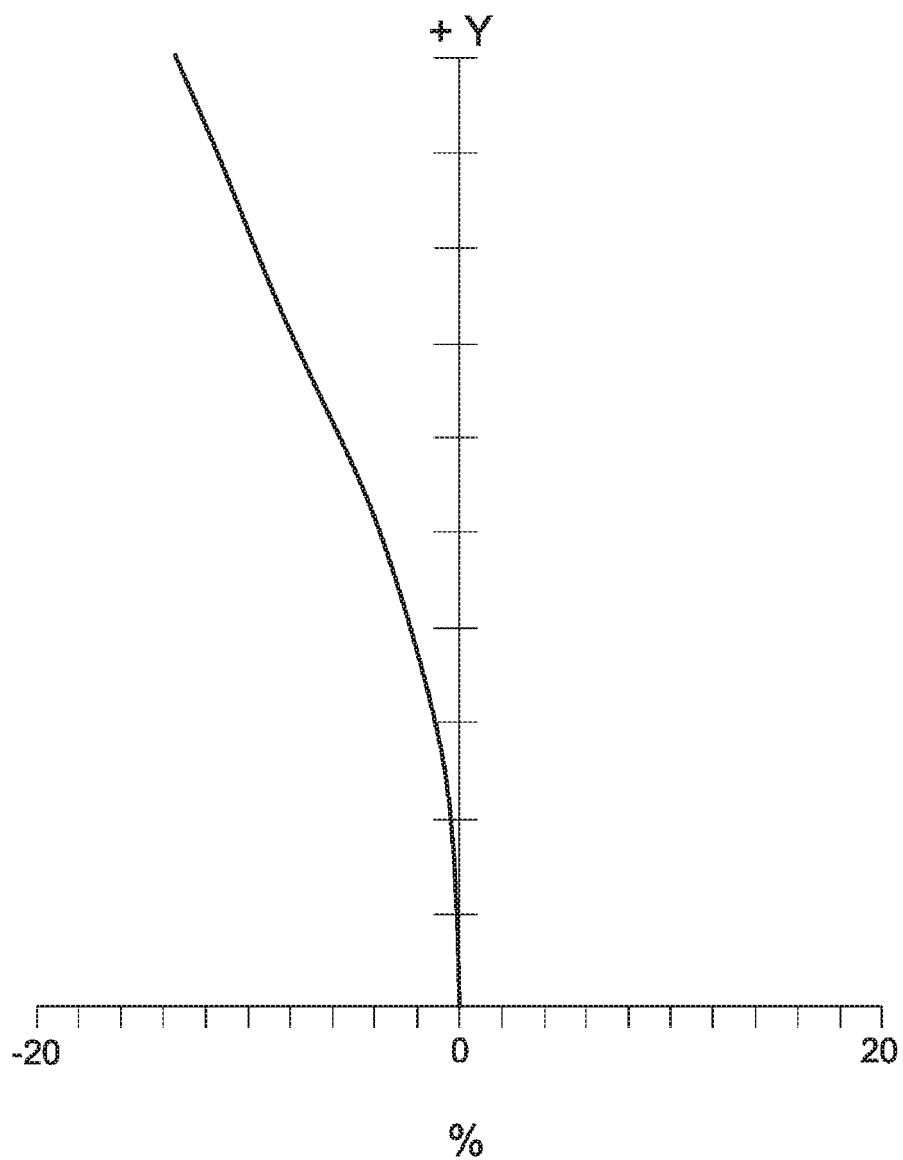
FIG. 6C is a distortion diagram of the wide-angle lens assembly in accordance with the third embodiment of the invention.

By the above arrangements of the lenses and stop ST3, the wide-angle lens assembly 3 of the third embodiment can meet the requirements of optical performance as seen in FIGS. 6A-6C.

It can be seen from FIG. 6A that the longitudinal aberration in the wide-angle lens assembly 3 of the third embodiment ranges from −0.001 mm to 0.01 mm.

It can be seen from FIG. 6B that the field curvature of tangential direction and sagittal direction in the wide-angle lens assembly 3 of the third embodiment ranges from −0.015 mm to 0.005 mm.

It can be seen from FIG. 6C that the distortion in the wide-angle lens assembly 3 of the third embodiment ranges from −14% to 0%.

It is obvious that the longitudinal aberration, the field curvature, and the distortion of the wide-angle lens assembly 3 of the third embodiment can be corrected effectively. Therefore, the wide-angle lens assembly 3 of the third embodiment is capable of good optical performance.

Figure 7:
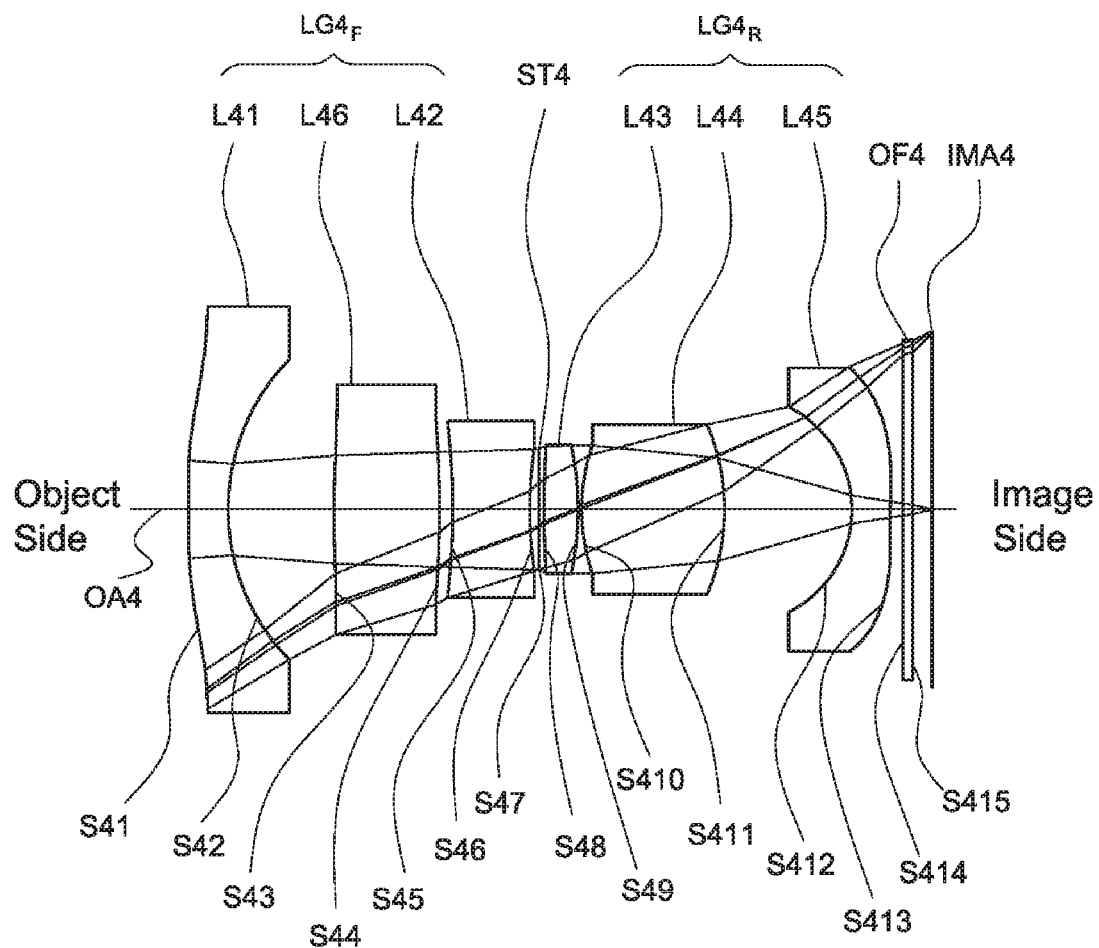
FIG. 7 is a lens layout and optical path diagram of a wide-angle lens assembly in accordance with a fourth embodiment of the invention.

Referring to FIG. 7, FIG. 7 is a lens layout and optical path diagram of a wide-angle lens assembly in accordance with a fourth embodiment of the invention. The wide-angle lens assembly 4 includes a front lens group $LG4_F$, a stop ST4, a rear lens group $LG4_R$, and an optical filter OF4, all of which are arranged in order from an object side to an image side along an optical axis OA4. The front lens group $LG4_F$ includes a first lens L41, a sixth lens L46, and a second lens L42. The rear lens group $LG4_R$ includes a third lens L43, a fourth lens L44, and a fifth lens L45. In operation, an image of light rays from the object side is formed at an image plane IMA4.

According to the foregoing, wherein: the second lens L42 is a biconcave lens, wherein the object side surface S45 is a concave surface and the object side surface S45 is a spherical surface; the object side surface S410 and image side surface S411 of the fourth lens L44 are spherical surfaces; the fifth lens L45 is a biconcave lens, wherein the image side surface S413 is a concave surface; the sixth lens L46 is a biconvex lens, wherein the object side surface S43 is a convex surface, the image side surface S44 is a convex surface, and the image side surface S44 is a spherical surface; and both of the object side surface S414 and image side surface S415 of the optical filter OF4 are plane surfaces.

With the above design of the lenses, stop ST4, and at least any one of the conditions (1)-(6) satisfied, the wide-angle lens assembly 4 can have an effective shortened total lens length, an effective reduced F-number, an effective reduced weight, an effective increased resolution, an effective corrected aberration, and is capable of an effective corrected chromatic aberration.

Table 10 shows the optical specification of the wide-angle lens assembly 4 in FIG. 7.

TABLE 10

Effective Focal Length = 5.125 mm F-number = 2.4
Total Lens Length = 16.66 mm Field of View = 106 Degrees

| Surface Number | Radius of Curvature (mm) | Thickness (mm) | Nd | Vd | Effective Focal Length (mm) | Remark |
|---|---|---|---|---|---|---|
| S41 | 8.76 | 0.75 | 1.5 | 55 | −15.8274 | Front Lens Group $LG4_F$ The First Lens L41 |
| S42 | 4.09 | 1.44 | | | | |
| S43 | 48.02 | 2.59 | 1.6 | 20 | 23.4839 | Front Lens Group $LG4_F$ The Sixth Lens L46 |
| S44 | −16.24 | 1.04 | | | | |
| S45 | −10.04 | 0.76 | 1.6 | 20 | −9.7491 | Front Lens Group $LG4_F$ The Second Lens L42 |
| S46 | 11.08 | 0.70 | | | | |
| S47 | ∞ | 0.09 | | | | Stop ST4 |
| S48 | 10.56 | 1.00 | 1.5 | 55 | 8.84346 | Rear Lens Group $LG4_R$ The Third Lens L43 |
| S49 | −5.05 | 0.09 | | | | |
| S410 | 5.21 | 4.23 | 1.5 | 70 | 5.546138 | Rear Lens Group $LG4_R$ The Fourth Lens L44 |
| S411 | −6.87 | 2.22 | | | | |
| S412 | −3.35 | 0.94 | 1.6 | 24 | −4.94463 | Rear Lens Group $LG4_R$ The Fifth Lens L45 |
| S413 | 146.42 | 0.29 | | | | |
| S414 | ∞ | 0.21 | 1.5 | 64 | | Optical Filter OF4 |
| S415 | ∞ | 0.43 | | | | |

The definition of aspheric surface sag z of each aspheric lens in table 10 is the same as that of in Table 1, and is not described here again.

In the fourth embodiment, the conic constant k and the aspheric coefficients A, B, C of each aspheric lens are shown in Table 11.

TABLE 11

| Surface Number | k | A | B | C |
|---|---|---|---|---|
| S41 | 0 | −1.23E−03 | 6.29E−06 | 0.00E+00 |
| S42 | 0 | −1.02E−03 | −5.56E−06 | 0.00E+00 |
| S43 | 0 | −9.52E−04 | −2.87E−05 | 0.00E+00 |
| S46 | 0 | 1.25E−03 | −3.30E−04 | 1.48E−05 |
| S48 | 0 | −4.30E−04 | −2.21E−04 | 0.00E+00 |
| S49 | 0 | −3.74E−05 | 2.02E−04 | 0.00E+00 |
| S412 | 0 | −6.18E−03 | 4.74E−04 | 0.00E+00 |
| S413 | 0 | −6.64E−03 | 0.00E+00 | 0.00E+00 |

Table 12 shows the parameters and condition values for conditions (1)-(6) in accordance with the fourth embodiment of the invention. It can be seen from Table 12 that the wide-angle lens assembly 4 of the fourth embodiment satisfies the conditions (1)-(6).

TABLE 12

| $f_f$ | −7.335 mm | | | | |
|---|---|---|---|---|---|
| $(f_H + f_I)/f$ | −4.053 | $f + f_1$ | −10.70 mm | $f_f - f$ | −12.46 mm |
| $Vd_G + Vd_H$ | 107 | $f_K - f_1$ | 24.67 mm | $TTL/T_G$ | 5.276 |

Figure 8A:
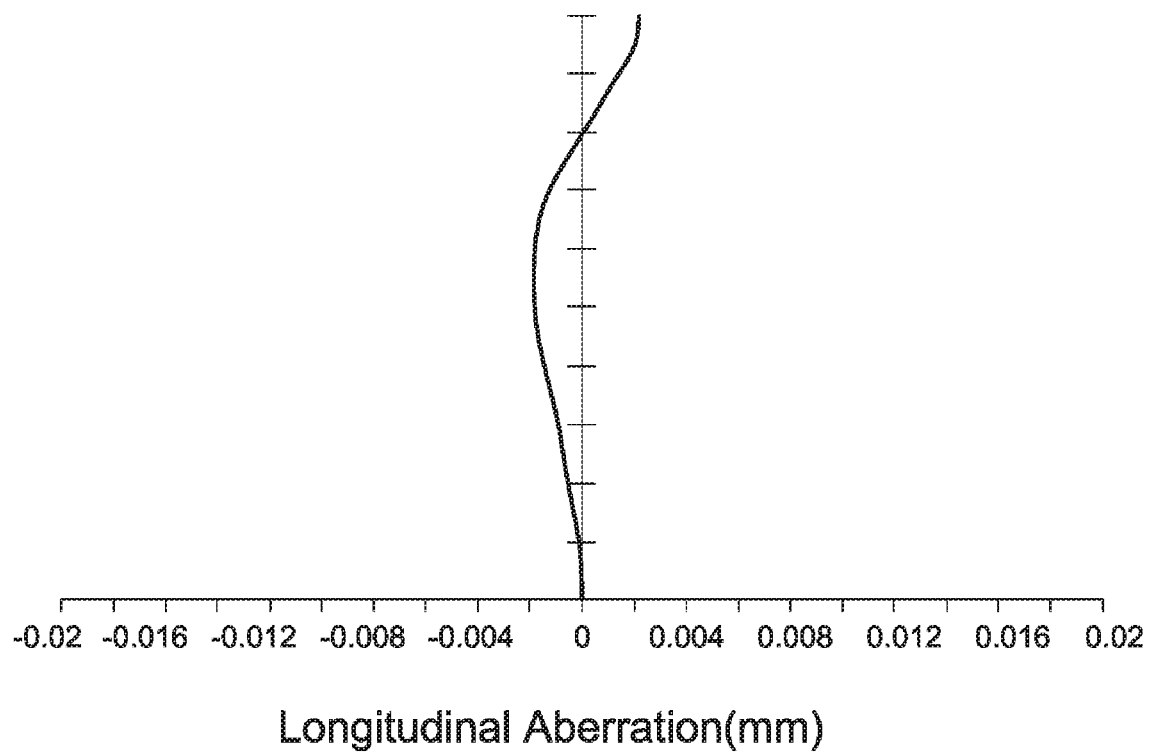
FIG. 8A depicts a longitudinal aberration diagram of the wide-angle lens assembly in accordance with the fourth embodiment of the invention.
Figure 8B:
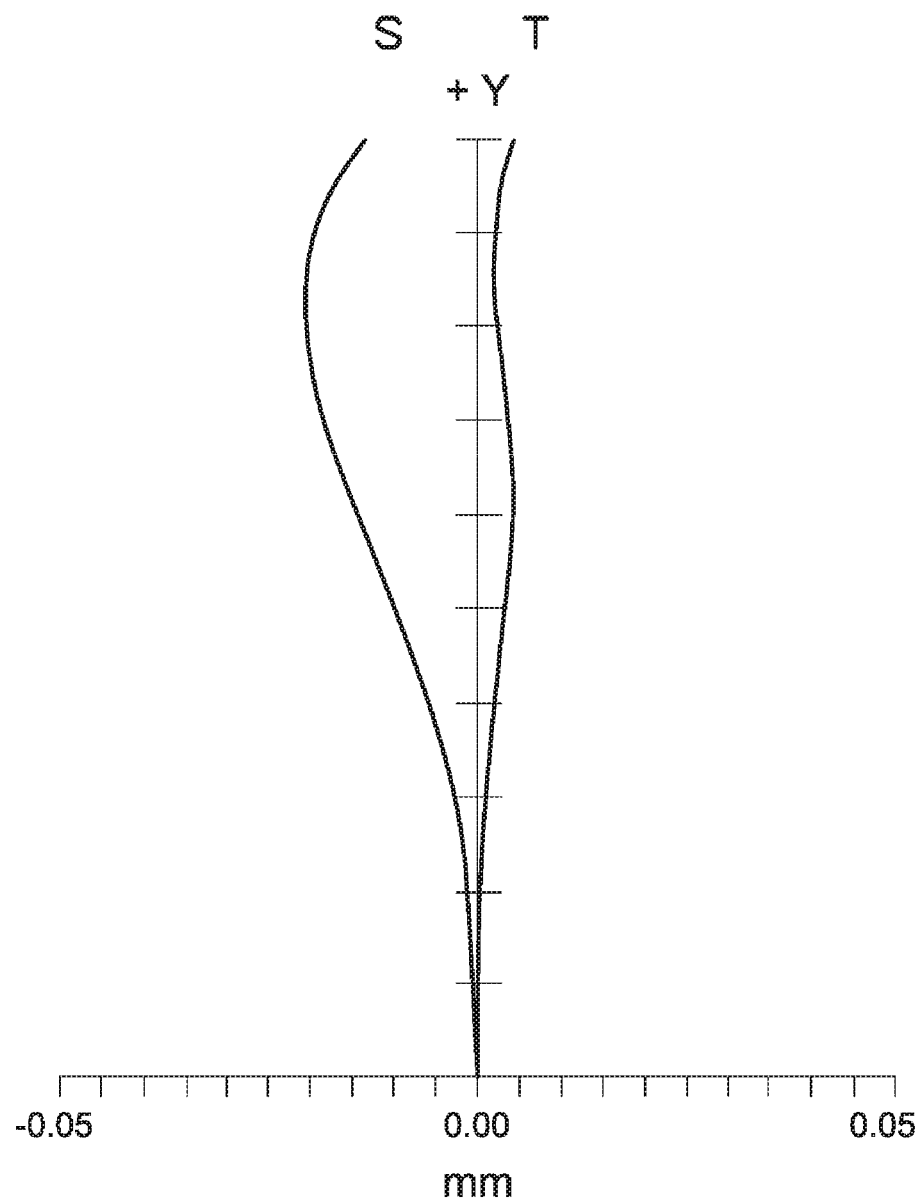
FIG. 8B is a field curvature diagram of the wide-angle lens assembly in accordance with the fourth embodiment of the invention.
Figure 8C:
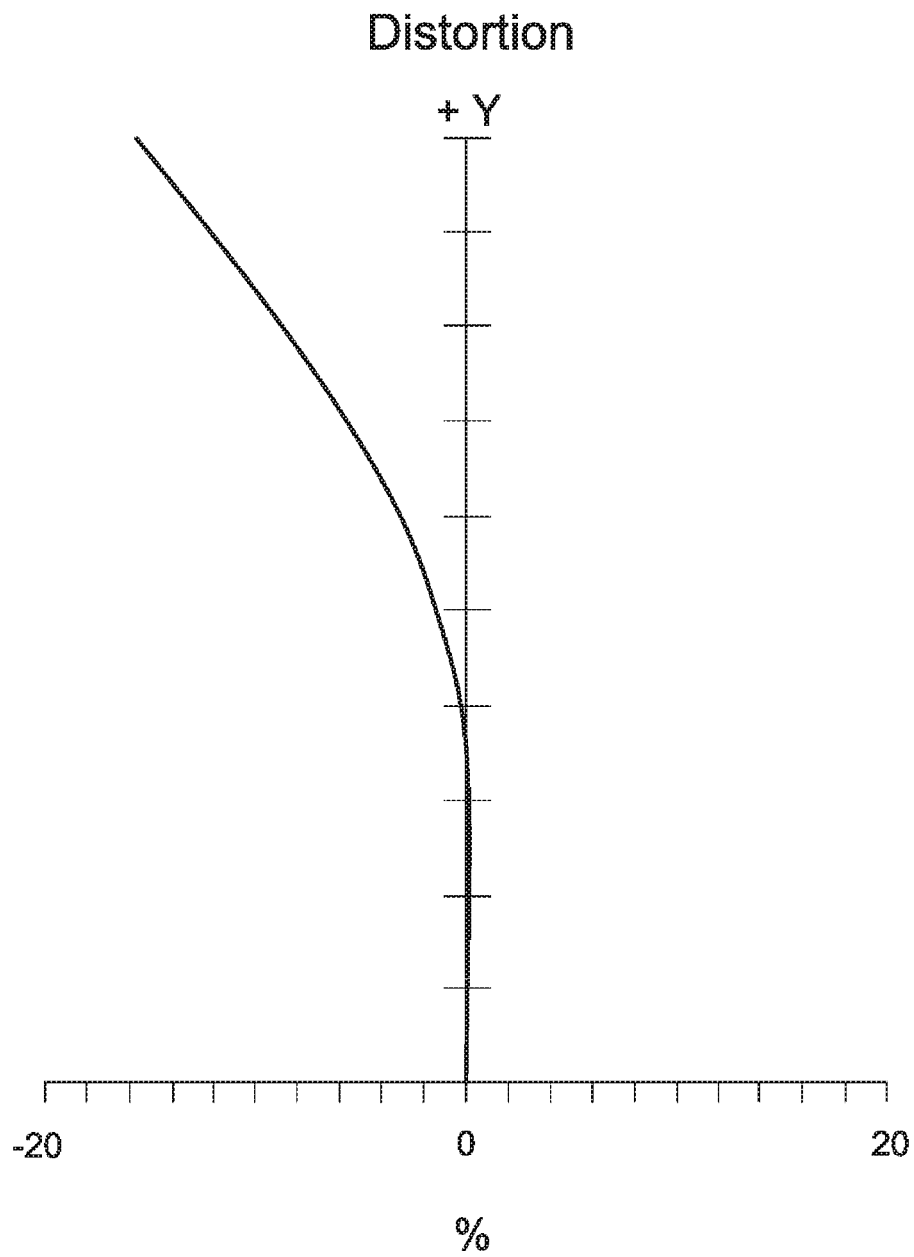
FIG. 8C is a distortion diagram of the wide-angle lens assembly in accordance with the fourth embodiment of the invention.

By the above arrangements of the lenses and stop ST4, the wide-angle lens assembly 4 of the fourth embodiment can meet the requirements of optical performance as seen in FIGS. 8A-8C.

It can be seen from FIG. 8A that the longitudinal aberration in the wide-angle lens assembly 4 of the fourth embodiment ranges from −0.002 mm to 0.002 mm.

It can be seen from FIG. 8B that the field curvature of tangential direction and sagittal direction in the wide-angle lens assembly 4 of the fourth embodiment ranges from −0.02 mm to 0.005 mm.

It can be seen from FIG. 8C that the distortion in the wide-angle lens assembly 4 of the fourth embodiment ranges from −16% to 1%.

It is obvious that the longitudinal aberration, the field curvature, and the distortion of the wide-angle lens assembly 4 of the fourth embodiment can be corrected effectively. Therefore, the wide-angle lens assembly 4 of the fourth embodiment is capable of good optical performance.

Figure 9:
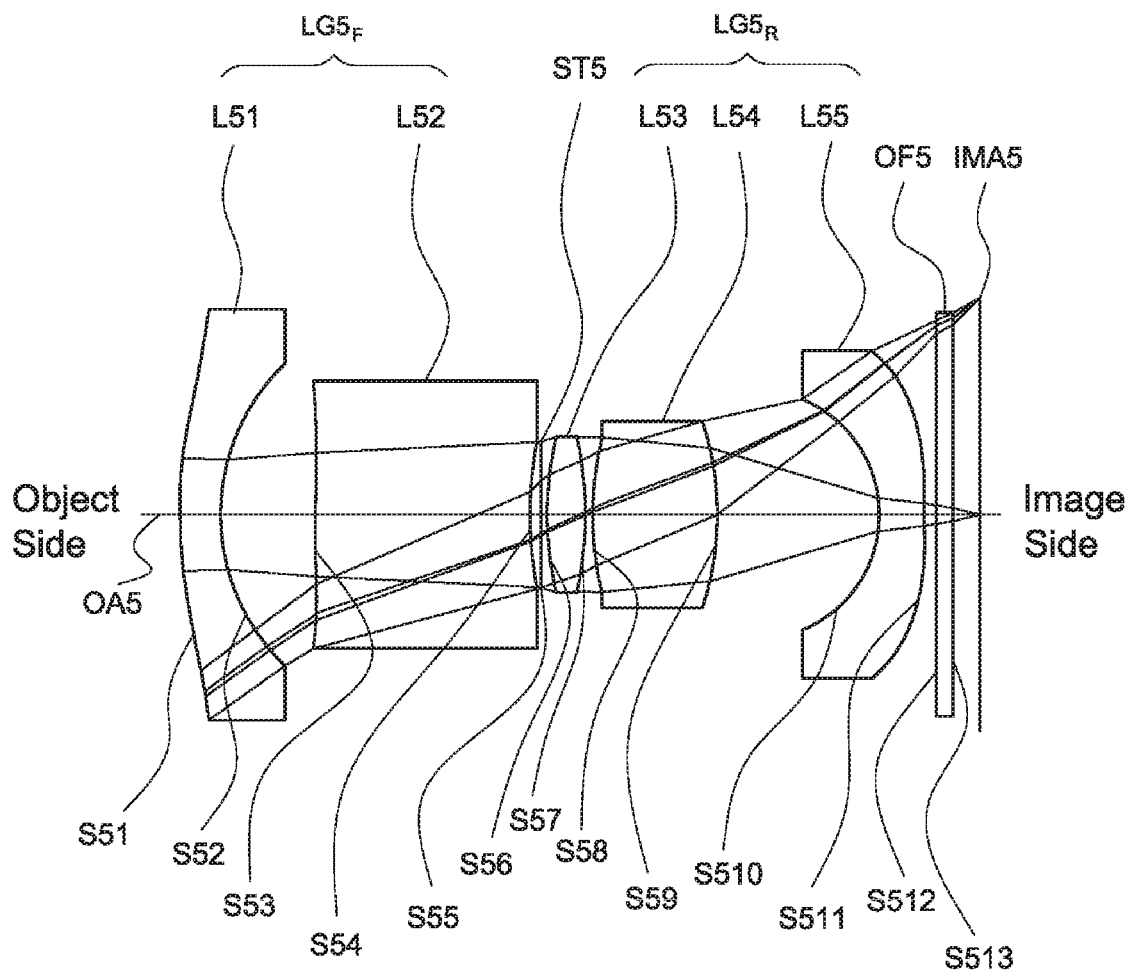
FIG. 9 is a lens layout and optical path diagram of a wide-angle lens assembly in accordance with a fifth embodiment of the invention.

Referring to FIG. 9, FIG. 9 is a lens layout and optical path diagram of a wide-angle lens assembly in accordance with a fifth embodiment of the invention. The wide-angle lens assembly 5 includes a front lens group $LG5_F$, a stop ST5, a rear lens group $LG5_R$, and an optical filter OF5, all of which are arranged in order from an object side to an image side along an optical axis OA5. The front lens group $LG5_F$ includes a first lens L51 and a second lens L52. The rear lens group $LG5_R$ includes a third lens L53, a fourth lens L54, and a fifth lens L55. In operation, an image of light rays from the object side is formed at an image plane IMA5.

According to the foregoing, wherein: the second lens L52 is a meniscus lens, wherein the object side surface S53 is a convex surface and the object side surface S53 is an aspheric surface; the object side surface S58 and image side surface S59 of the fourth lens L54 are spherical surfaces; the fifth lens L55 is a meniscus lens, wherein the image side surface S511 is a convex surface; and both of the object side surface S512 and image side surface S513 of the optical filter OF5 are plane surfaces.

With the above design of the lenses, stop ST5, and at least any one of the conditions (1)-(6) satisfied, the wide-angle lens assembly 5 can have an effective shortened total lens length, an effective reduced F-number, an effective reduced weight, an effective increased resolution, an effective corrected aberration, and is capable of an effective corrected chromatic aberration.

Table 13 shows the optical specification of the wide-angle lens assembly 5 in FIG. 9.

TABLE 13

EffectiveFocal Length = 4.047 mm  F-number = 2.41
Total Lens Length = 12.01 mm  Field of View = 106 Degrees

| Surface Number | Radius of Curvature (mm) | Thickness (mm) | Nd | Vd | Effective Focal Length (mm) | Remark |
|---|---|---|---|---|---|---|
| S51 | 7.01 | 0.60 | 1.5 | 55 | −10.7689 | Front Lens Group $LG5_F$ The First Lens L51 |

TABLE 13-continued

EffectiveFocal Length = 4.047 mm  F-number = 2.41
Total Lens Length = 12.01 mm  Field of View = 106 Degrees

| Surface Number | Radius of Curvature (mm) | Thickness (mm) | Nd | Vd | Effective Focal Length (mm) | Remark |
|---|---|---|---|---|---|---|
| S52 | 2.97 | 1.43 | | | | |
| S53 | 50.20 | 3.22 | 1.66 | 21 | −10.941 | Front Lens Group $LG5_F$ The second Lens L52 |
| S54 | 6.22 | 0.17 | | | | |
| S55 | ∞ | 0.10 | | | | Stop ST5 |
| S56 | 4.97 | 0.58 | 1.5 | 55 | 5.0853 | Rear Lens Group $LG5_R$ The Third Lens L53 |
| S57 | −5.05 | 0.10 | | | | |
| S58 | 4.44 | 1.89 | 1.5 | 82 | 4.762361 | Rear Lens Group $LG5_R$ The Fourth Lens L54 |
| S59 | −4.44 | 2.42 | | | | |
| S510 | −2.00 | 0.68 | 1.6 | 26 | −3.98219 | Rear Lens Group $LG5_R$ The Fifth Lens L55 |
| S511 | −13.16 | 0.19 | | | | |
| S512 | ∞ | 0.21 | 1.5 | 64 | | Optical Filter OF5 |
| S513 | ∞ | 0.43 | | | | |

The definition of aspheric surface sag z of each aspheric lens in table 13 is the same as that of in Table 1, and is not described here again.

In the fifth embodiment, the conic constant k and the aspheric coefficients A, B, C of each aspheric lens are shown in Table 14.

TABLE 14

| Surface Number | k | A | B | C |
|---|---|---|---|---|
| S51 | 0 | −3.50E−03 | 2.48E−05 | 0.00E+00 |
| S52 | 0 | −2.87E−03 | −1.58E−04 | 0.00E+00 |
| S53 | 0 | −3.27E−03 | −2.67E−04 | 0.00E+00 |
| S54 | 0 | 3.82E−03 | −2.30E−03 | 3.32E−04 |
| S56 | 0 | 2.30E−03 | −3.13E−03 | 0.00E+00 |
| S57 | 0 | 2.20E−03 | −9.33E−04 | 0.00E+00 |
| S510 | 0 | −1.49E−02 | 3.57E−04 | 0.00E+00 |
| S511 | 0 | −1.51E−02 | 0.00E+00 | 0.00E+00 |

Table 15 shows the parameters and condition values for conditions (1)-(6) in accordance with the fifth embodiment of the invention. It can be seen from Table 15 that the wide-angle lens assembly 5 of the fifth embodiment satisfies the conditions (1)-(6).

TABLE 15

| $f_f$ | −4.695 mm | | | | |
|---|---|---|---|---|---|
| $(f_H + f_I)/f$ | −3.645 | $f + f_1$ | −6.72 mm | $f_f - f$ | −8.742 mm |
| $Vd_G + Vd_H$ | 108 | $f_K - f_1$ | 15.85 mm | $TTL/T_G$ | 6.36 |

Figure 10A:
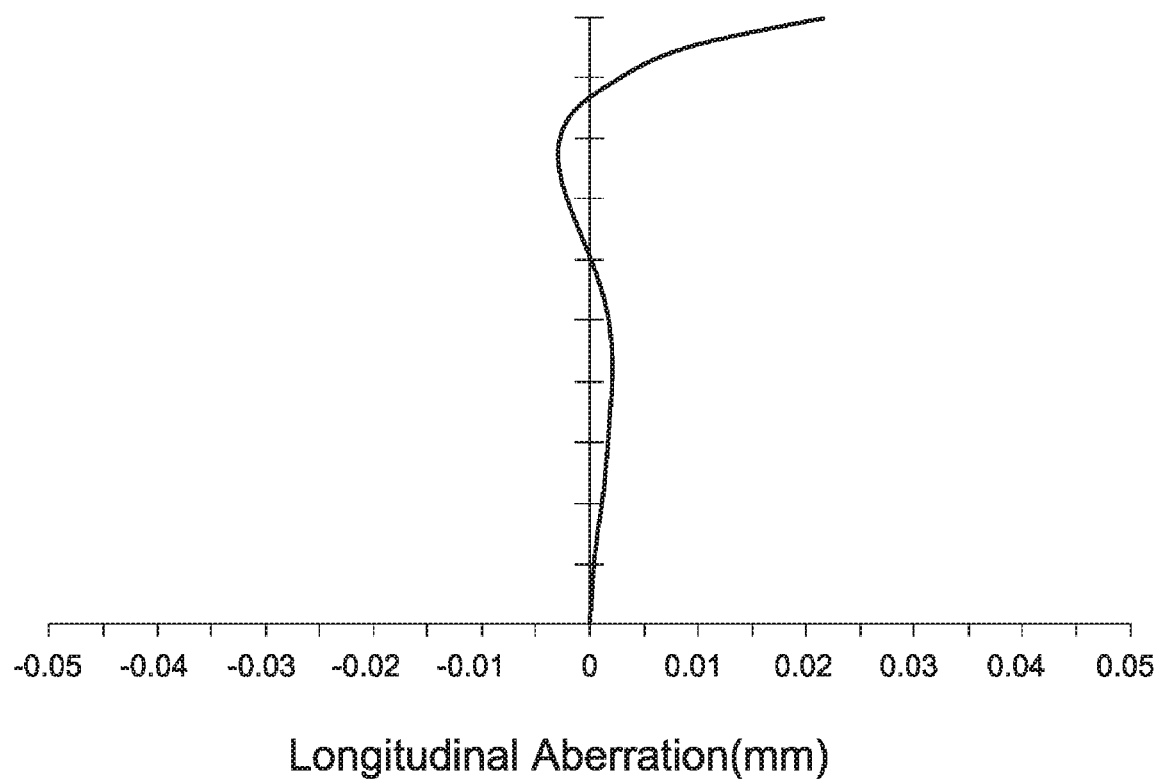
FIG. 10A depicts a longitudinal aberration diagram of the wide-angle lens assembly in accordance with the fifth embodiment of the invention.
Figure 10B:
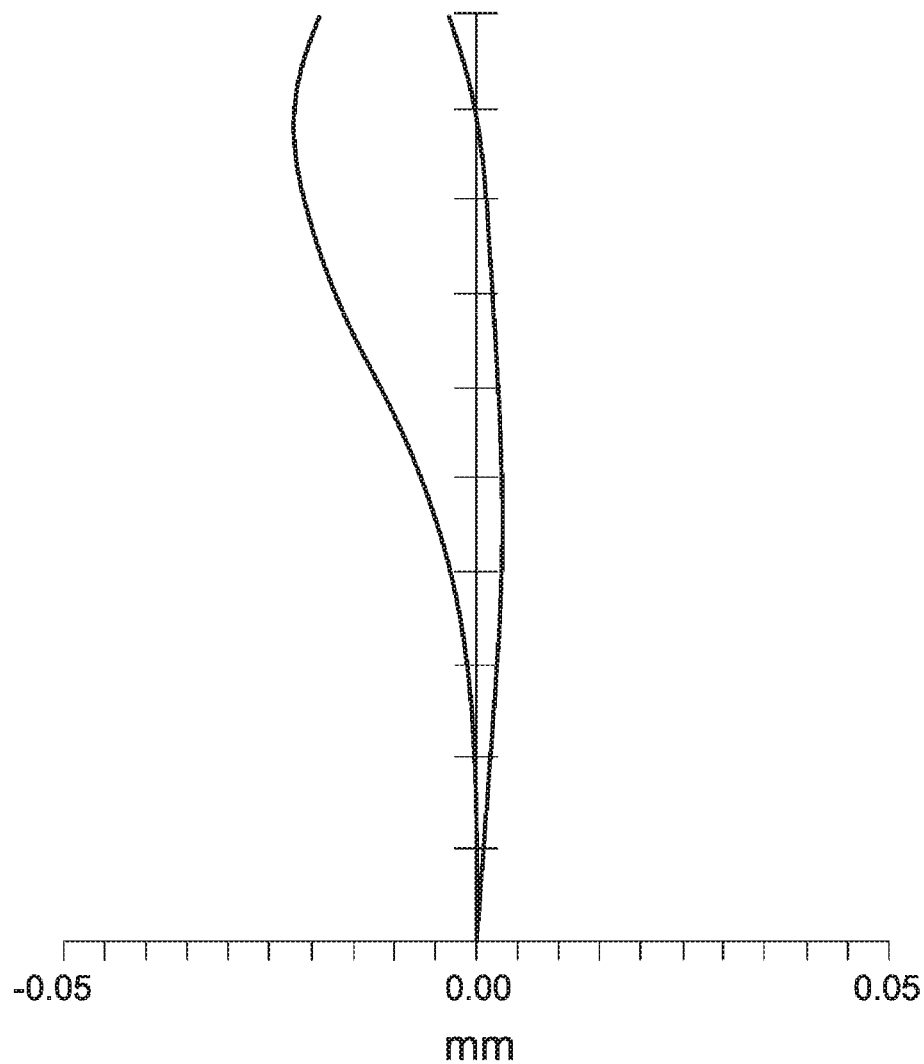
FIG. 10B is a field curvature diagram of the wide-angle lens assembly in accordance with the fifth embodiment of the invention.
Figure 10C:
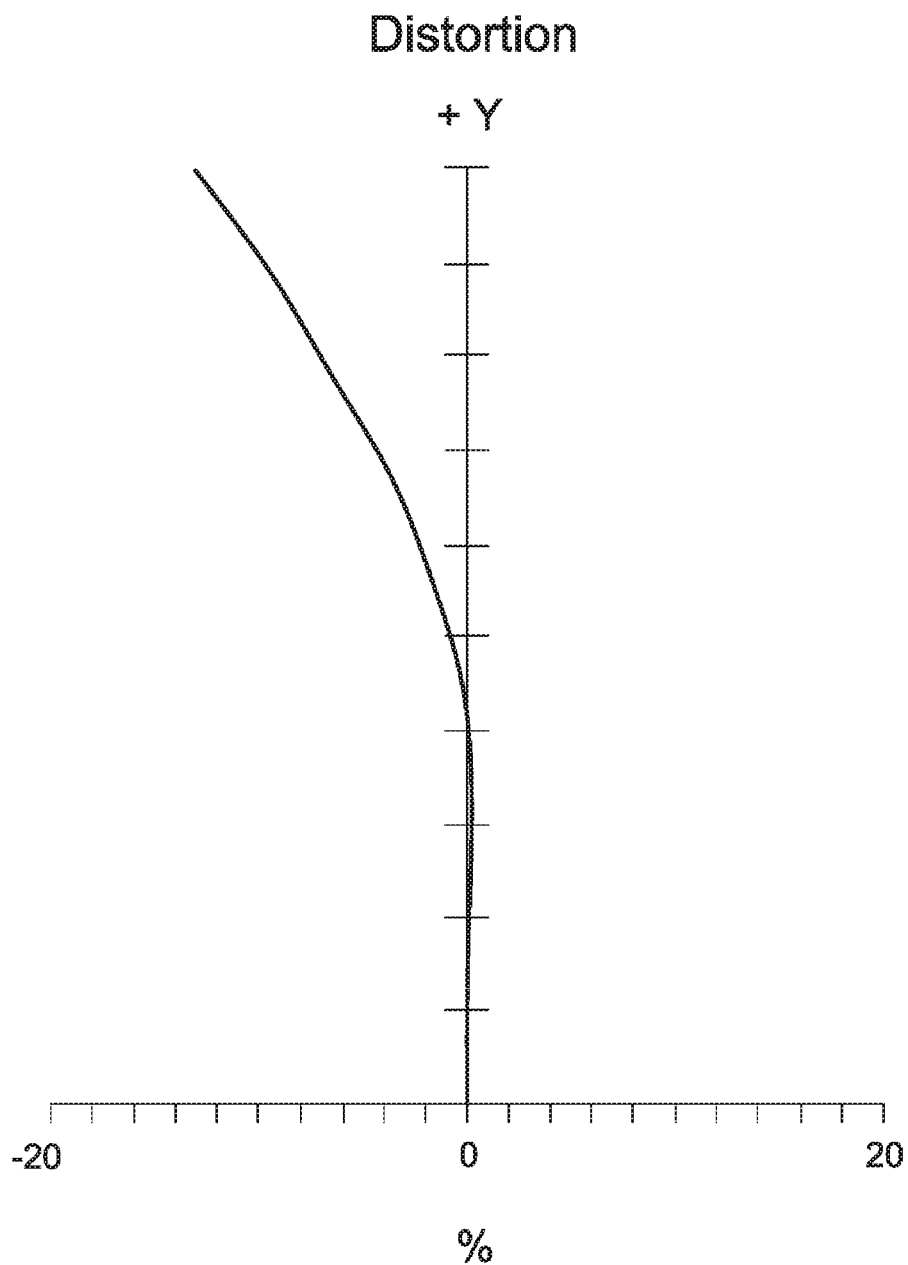
FIG. 10C is a distortion diagram of the wide-angle lens assembly in accordance with the fifth embodiment of the invention.

By the above arrangements of the lenses and stop ST5, the wide-angle lens assembly 5 of the fifth embodiment can meet the requirements of optical performance as seen in FIGS. 10A-10C.

It can be seen from FIG. 10A that the longitudinal aberration in the wide-angle lens assembly 5 of the fifth embodiment ranges from −0.005 mm to 0.025 mm.

It can be seen from FIG. 10B that the field curvature of tangential direction and sagittal direction in the wide-angle lens assembly 5 of the fifth embodiment ranges from −0.025 mm to 0.005 mm.

It can be seen from FIG. 10C that the distortion in the wide-angle lens assembly 5 of the fifth embodiment ranges from −14% to 1%.

It is obvious that the longitudinal aberration, the field curvature, and the distortion of the wide-angle lens assembly 5 of the fifth embodiment can be corrected effectively. Therefore, the wide-angle lens assembly 5 of the fifth embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wide-angle lens assembly comprising:
   a front lens group; and
   a rear lens group;
   wherein the front lens group comprises a first lens having negative refractive power and a second lens having negative refractive power, wherein the first lens is a meniscus lens and the second lens comprises a concave surface facing an image side;
   wherein the rear lens group comprises a third lens having positive refractive power, a fourth lens having positive refractive power, and a fifth lens having negative refractive power, wherein the fifth lens comprises a concave surface in a paraxial region facing an object side;
   wherein the first lens, the second lens, the third lens, the fourth lens, and the fifth lens are arranged in order from the object side to the image side along an optical axis;
   wherein the wide-angle lens assembly satisfies:

$13.6 \text{ mm} \leq f_K - f_1 \leq 25.2 \text{ mm}$;

wherein $f_K$ is an effective focal length of a lens third close to the image side and $f_1$ is an effective focal length of the first lens;
   wherein the front lens group further comprises a sixth lens having positive refractive power and disposed between the first lens and the second lens and the sixth lens comprises a concave surface a convex surface facing the object side and the concave surface of the sixth lens faces the image side.

2. The wide-angle lens assembly as claimed in claim 1, wherein:
   the first lens comprises a convex surface facing the object side and a concave surface facing the image side;
   the third lens is a biconvex lens;
   the fourth lens is a biconvex lens; and
   the wide-angle lens assembly satisfies at least one of the following conditions:

$-11.2 \text{ mm} \leq f + f_1 \leq -5.3 \text{ mm}$;

$-13 \text{ mm} \leq f_f - f \leq -8 \text{ mm}$;

$70 \leq Vd_G + Vd_H \leq 110$;

$3.1 \leq TTL/T_G \leq 6.4$;

wherein f is an effective focal length of the wide-angle lens assembly, $f_1$ is an effective focal length of the first lens, $f_f$ is an effective focal length of the front lens group, $Vd_G$ is an Abbe number of a lens second close to the image side, $Vd_H$ is an Abbe number of a lens closest to the image side, TTL is an interval from an object side surface of the first lens to an image plane along the optical axis, and $T_G$ is a thickness along the optical axis of a lens second close to the image side.

3. The wide-angle lens assembly as claimed in claim 1, wherein the second lens further comprises a concave surface facing the object side.

4. The wide-angle lens assembly as claimed in claim 1, wherein the wide-angle lens assembly satisfies:

$-4.2 \leq (f_H + f_1)/f \leq -3$;

wherein $f_1$ is an effective focal length of the first lens, $f_H$ is an effective focal length of a lens closest to the image side, and f is an effective focal length of the wide-angle lens assembly.

5. The wide-angle lens assembly as claimed in claim 1, further comprises an air gap disposed between the fourth lens and the fifth lens.

6. The wide-angle lens assembly as claimed in claim 1, further comprising a stop disposed between the front lens group and the rear lens group.

7. The wide-angle lens assembly as claimed in claim 1, wherein the fifth lens further comprises a convex surface facing the image side.

8. The wide-angle lens assembly as claimed in claim 1, wherein:
   the first lens comprises a convex surface facing the object side and a concave surface facing the image side;
   the third lens is a biconvex lens; and
   the fourth lens is a biconvex lens.

9. The wide-angle lens assembly as claimed in claim 1, wherein the wide-angle lens assembly satisfies:

$-11.2 \text{ mm} \leq f + f_1 \leq -5.3 \text{ mm}$;

wherein f is an effective focal length of the wide-angle lens assembly and $f_1$ is an effective focal length of the first lens.

10. The wide-angle lens assembly as claimed in claim 1, wherein the wide-angle lens assembly satisfies:

$-13 \text{ mm} \leq f_f - f \leq -8 \text{ mm}$;

wherein $f_f$ is an effective focal length of the front lens group and f is an effective focal length of the wide-angle lens assembly.

11. The wide-angle lens assembly as claimed in claim 1, wherein the wide-angle lens assembly satisfies:

$70 \leq Vd_G + Vd_H \leq 110$;

wherein $Vd_G$ is an Abbe number of a lens second close to the image side and $Vd_H$ is an Abbe number of a lens closest to the image side.

12. The wide-angle lens assembly as claimed in claim 1, wherein the wide-angle lens assembly satisfies:

$3.1 \leq TTL/T_G \leq 6.4$;

wherein TTL is an interval from an object side surface of the first lens to an image plane along the optical axis and $T_G$ is a thickness along the optical axis of a lens second close to the image side.

\* \* \* \* \*